US 11,473,791 B2

(12) United States Patent
Fujita et al.

(10) Patent No.: US 11,473,791 B2
(45) Date of Patent: Oct. 18, 2022

(54) HUMIDIFICATION DEVICE

(71) Applicant: DAIKIN INDUSTRIES, LTD., Osaka (JP)

(72) Inventors: Naotoshi Fujita, Osaka (JP); Eisaku Okubo, Osaka (JP); Nobuki Matsui, Osaka (JP); Yoshinori Narikawa, Osaka (JP)

(73) Assignee: DAIKIN INDUSTRIES, LTD, Osaka (JP)

( * ) Notice: Subject to any disclaimer, the term of this patent is extended or adjusted under 35 U.S.C. 154(b) by 120 days.

(21) Appl. No.: 16/470,605

(22) PCT Filed: Jan. 26, 2018

(86) PCT No.: PCT/JP2018/002534
§ 371 (c)(1),
(2) Date: Jun. 18, 2019

(87) PCT Pub. No.: WO2018/139596
PCT Pub. Date: Aug. 2, 2018

(65) Prior Publication Data
US 2019/0309964 A1    Oct. 10, 2019

(30) Foreign Application Priority Data
Jan. 26, 2017    (JP) .............................. JP2017-011852

(51) Int. Cl.
*F24F 3/14*    (2006.01)
*F24F 1/0083*    (2019.01)
(Continued)

(52) U.S. Cl.
CPC ............ *F24F 3/1429* (2013.01); *B01D 53/26* (2013.01); *F24F 1/0083* (2019.02); *F24F 3/14* (2013.01);
(Continued)

(58) Field of Classification Search
CPC .. F24F 11/36; F24F 11/70; F24F 11/89; F24F 11/30; F24F 3/147; F24F 3/153
See application file for complete search history.

(56) References Cited

U.S. PATENT DOCUMENTS

| 5,299,431 A * | 4/1994 | Iritani ................... B60H 1/3211 |
| | | 62/243 |
| 2014/0366567 A1* | 12/2014 | Vandermeulen ...... F24F 3/1417 |
| | | 62/271 |
| 2015/0040766 A1 | 2/2015 | Fujita et al. |
| 2015/0338140 A1* | 11/2015 | Vandermeulen ........ F24F 3/147 |
| | | 62/238.3 |

(Continued)

FOREIGN PATENT DOCUMENTS

| JP | 48-12581 | 4/1973 | |
| JP | S4812581 B1 * | 4/1973 | .............. F24F 11/36 |

(Continued)

*Primary Examiner* — Nelson J Nieves
*Assistant Examiner* — Meraj A Shaikh
(74) *Attorney, Agent, or Firm* — Birch, Stewart, Kolasch & Birch, LLP

(57) ABSTRACT

Disclosed is a humidity control apparatus which ensures a sufficient dehumidification amount without increasing an area of a gas-liquid contact portion in a dehumidification unit, regardless of the type of liquid absorbent used. The humidity control apparatus includes an absorbent circuit connecting a liquid-based dehumidification module, a recovery module, and a liquid-cooling heat exchanger which cools, with a refrigerant, a liquid absorbent before being used in the liquid-based dehumidification module. A refrigerant-cooling-based dehumidification module is positioned upstream of the liquid-based dehumidification module in a flow direction of target air, and cools and dehumidifies, with the refrigerant, the target air before being dehumidified in the module. The liquid-cooling heat exchanger and the refrigerant-cooling-based dehumidification module are connected to a single refrigerant circuit together with a liquid-heating heat exchanger.

15 Claims, 12 Drawing Sheets

(51) Int. Cl.
*F24F 11/70* (2018.01)
*F25B 39/02* (2006.01)
*F25B 39/04* (2006.01)
*F25B 6/04* (2006.01)
*F24F 11/87* (2018.01)
*B01D 53/26* (2006.01)

(52) U.S. Cl.
CPC ............ *F24F 3/1423* (2013.01); *F24F 11/70* (2018.01); *F24F 11/87* (2018.01); *F25B 6/04* (2013.01); *F25B 39/02* (2013.01); *F25B 39/04* (2013.01)

(56) References Cited

U.S. PATENT DOCUMENTS

2016/0187011 A1* 6/2016 Vandermeulen ........ F25B 13/00
62/271

FOREIGN PATENT DOCUMENTS

| | | |
|---|---|---|
| JP | 53-31638 | 8/1978 |
| JP | 53-115655 | 9/1978 |
| JP | 58-47729 U | 4/1981 |
| JP | 8-192022 A | 7/1996 |
| JP | 2010-36093 A | 2/2010 |
| JP | 2013-76559 A | 4/2013 |
| JP | 2014-129930 A | 7/2014 |
| JP | 2014-129985 A | 7/2014 |
| JP | 2014129985 A * | 7/2014 |
| WO | WO 2015/143332 A2 | 9/2015 |

* cited by examiner

FIG.5

| OPERATION MODE | DEHUMIDIFICATION BY REFRIGERANT-COOLING-BASED DEHUMIDIFICATION MODULE | DEHUMIDIFICATION BY LIQUID-BASED DEHUMIDIFICATION MODULE | HEATING AND COOLING OF LIQUID ABSORBENT | CIRCULATION OF LIQUID ABSORBENT (PUMP OPERATED) | OPERATION CONDITION |
|---|---|---|---|---|---|
| 1 | ○ | ○ | ○ | ○ | HIGH LOAD |
| 2 | — | ○ | ○ | ○ | MID-LOAD (HIGH LATENT HEAT LOAD) |
| 3 | — | ○ | — | ○ | LOW LOAD |
| 4 | ○ | — | — | — | HIGH SENSIBLE HEAT LOAD |
| 5 | ○ | ○ | — | ○ | HIGH LIQUID ABSORBENT CONCENTRATION |

FIG.12

HUMIDIFICATION DEVICE

TECHNICAL FIELD

The present invention relates to a humidity control apparatus for controlling humidity of the air using a liquid absorbent.

BACKGROUND ART

Some of apparatuses controlling the humidity in a room, such as a humidification device and a humidity control apparatus, use a hygroscopic liquid as a liquid absorbent, as described in Patent Document 1.

Patent Document 1 discloses a humidity controller including a dehumidification unit (treatment machine) for dehumidifying a room, and a recovery unit (regeneration machine) for recovering a liquid absorbent that has been used for dehumidification. The dehumidification unit (treatment machine) passes target air through the cooled liquid absorbent to absorb moisture in the air, thereby dehumidifying the air. The recovery unit passes recovery air through the liquid absorbent which has been heated after being used for the dehumidification to release the moisture in the liquid absorbent into the air, thereby recovering the liquid absorbent.

The dehumidification unit of Patent Document 1 further includes a gas-liquid contact portion (contactor) and a liquid tank. The cooled liquid absorbent is brought into contact with the target air in the gas-liquid contact portion, and then is stored in the liquid tank.

CITATION LIST

Patent Document

Japanese Unexamined Patent Application No. 2010-36093

SUMMARY OF THE INVENTION

Technical Problem

According to Patent Document 1, increasing the area of the gas-liquid contact portion of the dehumidification unit can be a possible measure to ensure a sufficient dehumidification amount. This is because the contact surface between the liquid absorbent and the target air increases with the increase in the area of the gas-liquid contact portion. However, when this method is employed, the size of the humidity controller increases, and the amount of the liquid absorbent used also increases. This leads to the increase in the cost of the humidity controller. Moreover, energy required for the recovery unit to recover the liquid absorbent increases with the increase in the amount of dehumidification by the liquid absorbent.

It is also conceivable to use a liquid having relatively high hygroscopic performance as the liquid absorbent to improve the dehumidification capacity. However, such a highly hygroscopic liquid is limited to some kinds of liquid such as lithium chloride and lithium bromide.

In view of the foregoing, it is therefore an object of the present invention to ensure a sufficient dehumidification amount without limiting the kind of liquid absorbent used and increasing the area of the gas-liquid contact portion of the dehumidification unit.

Solution to the Problem

A first aspect of the present disclosure is directed to a humidity control apparatus including: an absorbent circuit (15) connecting a liquid-based dehumidification unit (21) which causes a liquid absorbent to absorb moisture in target air to dehumidify the target air, a recovery unit (31) which releases the moisture in the liquid absorbent to air for recovery to recover the liquid absorbent, and a pump (37) capable of circulating the liquid absorbent between the liquid-based dehumidification unit (21) and the recovery unit (31); a liquid-cooling heat exchanger (46) which is connected to the absorbent circuit (15) and cools, with a refrigerant, the liquid absorbent before being used for dehumidification in the liquid-based dehumidification unit (21); and a refrigerant-cooling-based dehumidification unit (48) which is positioned upstream of the liquid-based dehumidification unit (21) in a flow direction of the target air, and cools and humidifies, with the refrigerant, the target air before being dehumidified in the liquid-based dehumidification unit (21). The liquid-cooling heat exchanger (46) and the refrigerant-cooling-based dehumidification unit (48) are connected to a single refrigerant circuit (40) together with a liquid-heating heat exchanger (44) which heats the liquid absorbent before being recovered by the recovery unit (31) with the refrigerant.

In this aspect, the liquid absorbent is cooled by the refrigerant in the liquid-cooling heat exchanger (46) of the refrigerant circuit (40), and then supplied to the liquid-based dehumidification unit (21). In the liquid-based dehumidification unit (21), moisture is absorbed from the target air using the liquid absorbent to dehumidify the air. On the other hand, the liquid absorbent is heated by the refrigerant in the liquid-heating heat exchanger (44) of the refrigerant circuit (40), and then supplied to the recovery unit (31). In the recovery unit (31), the liquid absorbent that has absorbed moisture from the target air and had its concentration reduced in the liquid-based dehumidification unit (21) is recovered by releasing the moisture in the recovery air.

In particular, in this aspect, the target air is first cooled and dehumidified by the refrigerant in the refrigerant-cooling-based dehumidification unit (48) of the refrigerant circuit (40), and then dehumidified by the liquid-based dehumidification unit (21). Thus, regardless of the degree of the hygroscopic performance of the liquid absorbent, the target air can be sufficiently dehumidified without intentionally increasing the contact area between the liquid absorbent and the target air in the liquid-based dehumidification unit (21).

The refrigerant-cooling-based dehumidification unit (48), the liquid-cooling heat exchanger (46), and the liquid-heating heat exchanger (44) are connected to the single refrigerant circuit (40). Therefore, the degree of dehumidification can be controlled by, for example, changing the circulation amount of the refrigerant.

A second aspect of the present disclosure is an embodiment of the first aspect. In the second aspect, the target air dehumidified in the refrigerant-cooling-based dehumidification unit (48) and the liquid-based dehumidification unit (21) is supplied into a room, and a heat dissipation heat exchanger (43) is further connected to the refrigerant circuit (40), the heat dissipation heat exchanger (43) dissipating heat of the refrigerant that has passed through the refrigerant-cooling-based dehumidification unit (48) to a heat dissipation fluid other than the air in the room.

In the absorbent circuit (15), the recovery unit (31) having a recovery capacity that balances with the dehumidification performance of the liquid-based dehumidification unit (21)

is used. The target air is dehumidified in two stages by the refrigerant-cooling-based dehumidification unit (48) and the liquid-based dehumidification unit (21). Therefore, an additional heat dissipation means is required for dissipating heat (condensation heat) generated when the refrigerant-cooling-based dehumidification unit (48) cools and dehumidifies the target air. Here, the heat dissipation heat exchanger (43) is provided as the heat dissipation means. The heat dissipation heat exchanger (43) allows the refrigerant that has passed through the refrigerant-cooling-based dehumidification unit (48) to dissipate heat to a substance other than the air in the room. Thus, heat generated in the refrigerant-cooling-based dehumidification unit (48) can be dissipated, which can keep the condensation temperature of the refrigerant from increasing. Therefore, it is possible to avoid stopping of the dehumidification operation due to deterioration or abnormality in the dehumidification efficiency of the entire humidity control apparatus (10) accompanying the increase in the condensation temperature of the refrigerant.

A third aspect of the present disclosure is an embodiment of the second aspect. In the third aspect, the humidity control apparatus further includes: a supply control unit (51) which stops supply of the heat dissipation fluid to the heat dissipation heat exchanger (43) when a condensation temperature of the refrigerant in the refrigerant circuit (40) is equal to or lower than a predetermined value.

When the air-conditioning load is relatively small and the amount of heat generated in the refrigerant-cooling-based dehumidification unit (48) is small, the heat generated in the refrigerant-cooling-based dehumidification unit (48) can be sufficiently handled through the heat dissipation to the air used for the recovery in the recovery unit (31). Thus, the condensation temperature of the refrigerant is relatively lowered. Therefore, in this case, when the condensation temperature of the refrigerant is equal to or lower than a predetermined value, the supply of the heat dissipation fluid to the heat dissipation heat exchanger (43) is stopped so that the heat exchange operation between the heat dissipation fluid and the refrigerant in the heat dissipation heat exchanger (43) is stopped. Therefore, as compared to the case where the heat dissipation heat exchanger (43) performs the heat exchange operation when the condensation temperature of the refrigerant is equal to or lower than the predetermined value, the recovery temperature of the liquid absorbent increases, and the liquid absorbent is sufficiently recovered. Further, energy consumption can be reduced by stopping the supply of the heat dissipation fluid to the heat dissipation heat exchanger (43).

A fourth aspect of the present disclosure is an embodiment of any one of the first to third aspects. In the fourth aspect, the humidity control apparatus further includes: a mode operation control unit (52) which controls the absorbent circuit (15) and the refrigerant circuit (40) such that the humidity control apparatus (10) is operated in any one of a first dehumidification mode in which the target air is dehumidified by the liquid-based dehumidification unit (21) and the refrigerant-cooling-based dehumidification unit (48), a second dehumidification mode in which the target air is not dehumidified by the refrigerant-cooling-based dehumidification unit (48), but is dehumidified by the liquid-based dehumidification unit (21), or a third dehumidification mode in which the target air is not dehumidified by the liquid-based dehumidification unit (21), but is dehumidified by the refrigerant-cooling-based dehumidification unit (48).

Thus, the dehumidification operation suitable for the air-conditioning load, for example, can be performed.

A fifth aspect of the present disclosure is an embodiment of any one of the first to fourth aspects. In the fifth aspect, the humidity control apparatus further includes: a refrigerant circuit control unit (50) which controls the refrigerant circuit (40) such that a temperature of the target air that has flowed out of the refrigerant-cooling-based dehumidification unit (48) and is not dehumidified yet by the liquid-based dehumidification unit (21) is equal to or higher than a temperature of the liquid absorbent flowing into the liquid-based dehumidification unit (21).

This can avoid a phenomenon in which the target air is excessively cooled and dehumidified by the refrigerant-cooling-based dehumidification unit (48), and the dehumidification amount in the liquid-based dehumidification unit (21) is significantly decreased, as a result of which the efficiency of dehumidification of the target air by the entire humidity control apparatus (10) is impaired. Further, this can reduce the possibility of the occurrence of reheat loss by the liquid absorbent in the liquid-based dehumidification unit (21).

Advantages of the Invention

According to the aspects of the present disclosure, regardless of the degree of the hygroscopic performance of the liquid absorbent, the target air can be sufficiently dehumidified without intentionally increasing the contact area between the liquid absorbent and the air in the liquid-based dehumidification unit (21). Further, the degree of dehumidification can be easily controlled by, for example, changing the circulation amount of the refrigerant.

BRIEF DESCRIPTION OF THE DRAWINGS

FIG. 5 is a table showing details of first to fifth operation modes for the humidity control apparatus of the second embodiment, including whether a dehumidification operation is performed or not, whether the liquid absorbent circulates or not, and operation conditions.

FIG. 12 is a diagram illustrating the humidity control apparatus of the third embodiment obtained by providing components such as a temperature detection sensor for the humidity control apparatus of the first embodiment.

DESCRIPTION OF EMBODIMENTS

An embodiment of the present invention will be described in detail with reference to the drawings. The embodiments described below are merely exemplary ones in nature, and are not intended to limit the scope, applications, or use of the invention.

First Embodiment

<Outline>

A humidity control apparatus (10) according to a first embodiment, which corresponds to a humidification device, dehumidifies an internal space of such as an office building or a house (will be hereinafter referred to as a "room") by generally using a liquid absorbent.

Figure 1:
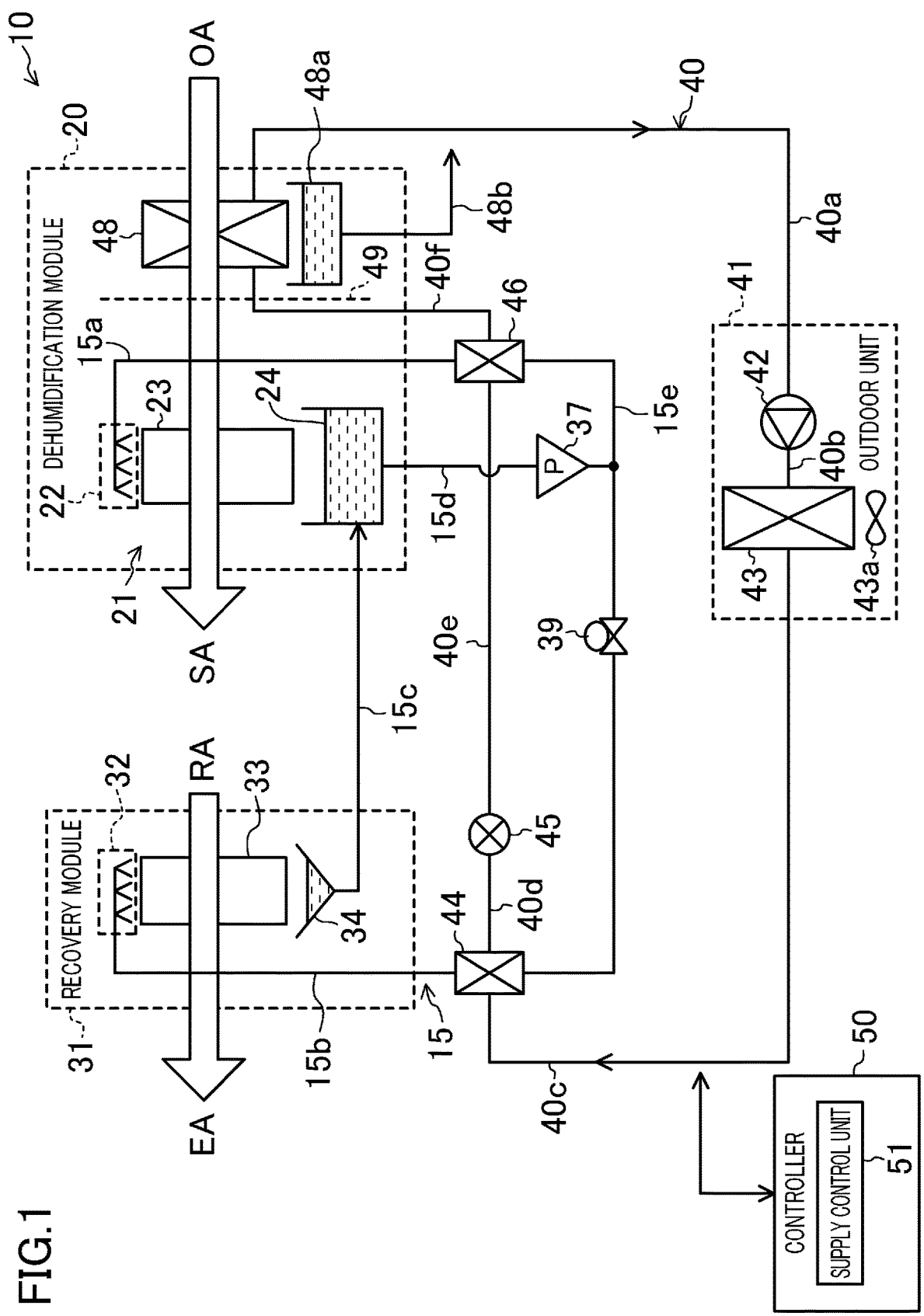
FIG. 1 is a diagram schematically illustrating the configuration of a humidity control apparatus of a first embodiment.

As shown in FIG. 1, the humidity control apparatus (10) of the first embodiment includes a dehumidification module (20) which dehumidifies the air. The dehumidification module (20) includes a liquid-based dehumidification module (21) which performs dehumidification using a liquid absorbent (corresponding to a liquid-based dehumidification unit), and a refrigerant-cooling-based dehumidification module (48) which performs dehumidification using a refrigerant (corresponding to a refrigerant-cooling-based dehumidification unit).

This humidity control apparatus (10) includes an absorbent circuit (15) in which the liquid absorbent circulates, and a refrigerant circuit (40) in which the refrigerant circulates. The liquid-based dehumidification module (21) is one of devices constituting the absorbent circuit (15). All of the devices constituting the absorbent circuit (15) are installed in a space other than the room (e.g., a machine chamber). Devices constituting the refrigerant circuit (40) include a compressor (42) and a heat dissipation condenser (43) (corresponding to a heat dissipation heat exchanger), in addition to the refrigerant-cooling-based dehumidification module (48) described above. The compressor (42) and the heat dissipation condenser (43) are components of an outdoor unit (41), and are installed outdoors. Among the devices constituting the refrigerant circuit (40), other devices than the compressor (42) and the heat dissipation condenser (43) are installed in a space different from the room (e.g., a machine chamber) just like the devices constituting the absorbent circuit (15).

—Liquid Absorbent—

The liquid absorbent is a liquid capable of absorbing moisture (water vapor) in the air. In general, examples of the liquid absorbent used in the humidity control apparatus (10) include an aqueous lithium chloride solution and an aqueous lithium bromide solution. These solutions have good hygroscopic performance, but have relatively high corrosiveness. Use of these aqueous solutions requires additional measures to protect the humidity control apparatus (10) from corrosion. Thus, it is difficult to safely use these aqueous solutions.

In contrast, in the first embodiment, a liquid which is less hygroscopic, but is less corrosive, than the above aqueous solutions can be used as a liquid absorbent. The liquid can be used safely because it is low in corrosiveness. Examples of such a liquid include ionic liquids. The ionic liquid is a salt composed of ions, and is in a liquid state at 100° C. or less.

<Configuration of Humidity Control Apparatus>

The humidity control apparatus (10) includes the absorbent circuit (15), the refrigerant circuit (40), and a controller (50) for performing various controls of the circuits (15, 40).

—Absorbent Circuit—

The absorbent circuit (15) includes the liquid-based dehumidification module (21) described above, and a recovery module (31) (corresponding to a recovery unit) as modules for exchanging moisture between the liquid absorbent and the air. The absorbent circuit (15) further includes a pump (37), a flow control valve (39), a liquid-heating heat exchanger (44), and a liquid-cooling heat exchanger (46). The modules (21, 31), the pump (37), and other components connected via connection pipes (15a to 15e) constitute the absorbent circuit (15).

—Liquid-Based Dehumidification Module—

The liquid-based dehumidification module (21) allows the liquid absorbent to absorb moisture in the target air to dehumidify the target air. Specifically, the liquid-based dehumidification module (21) includes a dehumidification-side liquid feeder (22), a dehumidification-side gas-liquid contact portion (23), and a liquid tank (24).

The dehumidification-side liquid feeder (22) has, for example, a plurality of drip ports formed at a pipe portion connected to one end of the connection pipe (15a). The plurality of drip ports, from which the liquid absorbent is dripped, are arranged side by side in the extending direction of the pipe portion.

The dehumidification-side gas-liquid contact portion (23) is made of a hydrophilic filler, and is positioned below the dehumidification-side liquid feeder (22). Receiving outdoor air (OA), which is the target air supplied thereto, the dehumidification-side gas-liquid contact portion (23) brings the outdoor air (OA) into contact with the liquid absorbent dripped from the dehumidification-side liquid feeder (22). Thus, the outdoor air (OA) that has passed through the dehumidification-side gas-liquid contact portion (23) has its moisture content further reduced than that before the passage, i.e., is dehumidified. In other words, the liquid absorbent that has been dripped to the dehumidification-side gas-liquid contact portion (23) and made contact with the outdoor air (OA) has its concentration further reduced than that before being dripped to the dehumidification-side gas-liquid contact portion (23).

The liquid tank (24) is closer to the liquid-based dehumidification module (21) than to the recovery module (31), and more specifically, located below the dehumidification-side gas-liquid contact portion (23). The liquid tank (24) also functions as a dehumidification-side liquid receiver which receives the liquid absorbent that has made contact with the outdoor air (OA) in the dehumidification-side gas-liquid contact portion (23), and stores the liquid absorbent that has been used for the dehumidification. That is, the liquid-based dehumidification module (21) of the first embodiment does not include the dehumidification-side liquid receiver and the liquid tank separated from each other. This can reduce the increase in the cost of the humidity control apparatus (10) as compared to the case where the dehumidification-side liquid receiver and the liquid tank are separately provided.

—Recovery Module—

The recovery module (31) releases the moisture in the liquid absorbent to air used for recovery to recover the liquid absorbent. Specifically, the recovery module (31) includes a recovery-side liquid feeder (32), a recovery-side gas-liquid contact portion (33), and a recovery-side liquid receiver (34).

The recovery-side liquid feeder (32) has, for example, a plurality of drip ports formed at a pipe portion connected to one end of the connection pipe (15b). The plurality of drip ports, from which the liquid absorbent is dripped, are arranged side by side in the extending direction of the pipe portion.

The recovery-side gas-liquid contact portion (33) is made of a hydrophilic filler, and is positioned below the recovery-side liquid feeder (32). Receiving room air (RA), which is the recovery air supplied thereto, the recovery-side gas-liquid contact portion (33) brings the room air (RA) into contact with the liquid absorbent dripped from the recovery-side liquid feeder (32). Then, the moisture in the dripped liquid absorbent is released to the recovery air. As a result, the liquid absorbent that has passed through the recovery-side gas-liquid contact portion (33) has its concentration further increased than that before being dripped to the recovery-side gas-liquid contact portion (33).

The recovery-side liquid receiver (34) is closer to the recovery module (31) than to the liquid-based dehumidification module (21), and more specifically, located below the recovery-side gas-liquid contact portion (33). The recovery-side liquid receiver (34) receives the liquid absorbent which has been recovered by making contact with the room air (RA) in the recovery-side gas-liquid contact portion (33). The recovery-side liquid receiver (34) and the liquid tank (24) are connected together via the connection pipe (15c). The liquid absorbent received by the recovery-side liquid receiver (34) (i.e., the recovered liquid absorbent) is sent to the single liquid tank (24) through the connection pipe (15c).

Specifically, the liquid tank (24) according to the first embodiment stores the liquid absorbent that has been used for the dehumidification of the target air (outdoor air (OA)) in the dehumidification-side gas-liquid contact portion (23) of the liquid-based dehumidification module (21), and the liquid absorbent that has been recovered in the recovery-side gas-liquid contact portion (33) of the recovery module (31) in a mixed state. The concentration of the liquid absorbent that has been used for the dehumidification is lower than the concentration of the recovered liquid absorbent. Therefore, the low concentration liquid absorbent that has been used for the dehumidification and the high concentration liquid absorbent that has been recovered are stored in a single common tank, namely, the liquid tank (24).

In particular, the connection pipe (15c) connects the recovery-side liquid receiver (34) and the liquid tank (24) so that the bottom of the recovery-side liquid receiver (34) serves as a liquid inlet, and the side of the liquid tank (24) serves as a liquid outlet. The liquid outlet is located below the liquid inlet. Thus, the liquid absorbent is allowed to flow from the recovery-side liquid receiver (34) to the liquid tank (24) by using gravity (the self weight of the liquid absorbent). This makes it possible to collect the recovered liquid absorbent and the liquid absorbent that has been used for the dehumidification in the single liquid tank (24) even without providing, for the connection pipe (15c), a power source such as a pump for actively sending the liquid absorbent from the recovery-side liquid receiver (34) to the liquid tank (24).

In a preferred embodiment, the liquid tank (24) itself is disposed at a lower position than the recovery-side liquid receiver (34). This is because the liquid absorbent moves more easily by gravity from the recovery-side liquid receiver (34) to the liquid tank (24).

—Pump—

The pump (37) is connected to the connection pipe (15d) and the connection pipe (15e). The pump (37) sends the liquid absorbent stored in the liquid tank (24) to each of the liquid-based dehumidification module (21) and the recovery module (31). That is, the pump (37) allows the liquid absorbent to circulate between the liquid-based dehumidification module (21) and the recovery module (31).

Note that one end of the connection pipe (15d) is connected to the liquid tank (24), and the other end thereof is connected to the input side of the pump (37). One end of the connection pipe (15e) is connected to the output side of the pump (37). The other end of the connection pipe (15e) is branched into two, one of which is connected to the liquid-cooling heat exchanger (46), and the other of which is connected to the liquid-heating heat exchanger (44) via the flow control valve (39).

—Flow Control Valve—

The flow control valve (39) is constituted of a proportional solenoid valve, and has its opening degree adjusted to control the flow rate of the liquid absorbent. The liquid absorbent stored in the liquid tank (24) can flow not only into the liquid-cooling heat exchanger (46), but also into the liquid-heating heat exchanger (44) after coming out of the pump (37). When the opening degree of the flow control valve (39) is adjusted, the amount of the liquid absorbent fed to the liquid-cooling heat exchanger (46) and the amount of the liquid absorbent fed to the liquid-heating heat exchanger (44) are adjusted to have a predetermined ratio.

—Liquid-Heating Heat Exchanger—

The liquid-heating heat exchanger (44) is, for example, a plate-shaped heat exchanger, and has, although not shown, an absorbent passage through which the liquid absorbent passes, and a refrigerant passage through which the refrigerant passes. An inlet of the absorbent passage is connected to the connection pipe (15e), and an outlet of the absorbent passage is connected to the recovery-side liquid feeder (32) of the recovery module (31) via the connection pipe (15b). An inlet of the refrigerant passage is connected to the heat dissipation condenser (43) via a connection pipe (40c), and an outlet of the refrigerant passage is connected to an expansion valve (45) via a connection pipe (40d). The liquid-heating heat exchanger (44) functions as a refrigerant condenser, and allows the liquid absorbent passing through the absorbent passage and the refrigerant passing through the refrigerant passage to exchange heat, thereby heating the liquid absorbent before being recovered by the recovery module (31) with the refrigerant. The liquid absorbent that has passed through the liquid-heating heat exchanger (44) is sent to the recovery module (31) and is recovered.

—Liquid-Cooling Heat Exchanger—

The liquid-cooling heat exchanger (46) is, for example, a plate-shaped heat exchanger, and has, although not shown, an absorbent passage through which the liquid absorbent passes and a refrigerant passage through which the refrigerant passes, just like the liquid-heating heat exchanger (44). An inlet of the absorbent passage is connected to the connection pipe (15e), and an outlet of the absorbent passage is connected to the dehumidification-side liquid feeder (22) of the liquid-based dehumidification module (21) via the connection pipe (15a). An inlet of the refrigerant passage is connected to the expansion valve (45) via a connection pipe (40e), and an outlet of the refrigerant passage is connected to the refrigerant-cooling-based dehumidification module (48) via a connection pipe (40f). The liquid-cooling heat exchanger (46) functions as a refrigerant evaporator, and allows the liquid absorbent passing through the absorbent passage and the refrigerant passing through the refrigerant passage to exchange heat. Specifically, in the liquid-cooling heat exchanger (46), the liquid absorbent which is not yet used for the dehumidification in the liquid-based dehumidification module (21) is cooled by the refrigerant. The liquid absorbent that has passed through the liquid-cooling heat exchanger (46) is sent to the liquid-based dehumidification module (21), and is used for the dehumidification.

—Refrigerant Circuit—

The refrigerant circuit (40) includes the compressor (42), the heat dissipation condenser (43), the liquid-heating heat exchanger (44), the expansion valve (45), the liquid-cooling heat exchanger (46), and the refrigerant-cooling-based dehumidification module (48) connected in series in this order by connection pipes (40a to 40f). Other components of the refrigerant circuit (40) than the liquid-heating heat exchanger (44) and the liquid-cooling heat exchanger (46) described above will be described below.

—Compressor—

The compressor (42) is located downstream of the refrigerant-cooling-based dehumidification module (48) in the flow direction of the refrigerant with the connection pipe (40a) interposed therebetween, and compresses and discharges the refrigerant. The compressor (42) is a variable capacity compressor, the number of revolutions (i.e., the operating frequency) of which is varied by an inverter circuit (not shown).

—Heat Dissipation Condenser—

The heat dissipation condenser (43) is, for example, a fin-and-tube heat exchanger, and has a refrigerant inlet connected to the discharge side of the compressor (42) via the connection pipe (40b), and a refrigerant outlet connected to the inlet of the refrigerant passage in the liquid-heating heat exchanger (44) via the connection pipe (40c). That is, the heat dissipation condenser (43) is located downstream of the refrigerant-cooling-based dehumidification module (48) in the flow direction of the refrigerant. The heat dissipation condenser (43) dissipates heat of the refrigerant that has passed through the refrigerant-cooling-based dehumidification module (48) and discharged from the compressor (42) to the heat dissipation fluid, thereby condensing the refrigerant. The refrigerant that has dissipated heat further dissipates heat to the liquid absorbent in the liquid-heating heat exchanger (44) to be condensed.

Note that the heat dissipation fluid is a substance other than the room air (RA), such as the outdoor air (OA) and water. In the first embodiment, the heat dissipation fluid is the outdoor air (OA), and the heat dissipation condenser (43) is an air-refrigerant heat exchanger for exchanging heat between the outdoor air (OA) and the refrigerant.

In the vicinity of the heat dissipation condenser (43), a fan (43a) is provided for supplying the heat dissipation condenser (43) with the outdoor air (OA), which is the heat dissipation fluid. The fan (43a) is operated when the heat of the refrigerant needs to be dissipated in the heat dissipation condenser (43). Details will be described later in the section of "—Supply Control Unit—."

—Expansion Valve—

The expansion valve (45) is constituted of an electronic expansion valve. The expansion valve (45) is connected to the outlet of the refrigerant passage in the liquid-heating heat exchanger (44) via the connection pipe (40d), and is connected to the inlet of the refrigerant passage in the liquid-cooling heat exchanger (46) via the connection pipe (40e). The expansion valve (45) decompresses the refrigerant circulating in the refrigerant circuit (40) by changing its opening degree.

—Refrigerant-Cooling-Based Dehumidification Module—

The refrigerant-cooling-based dehumidification module (48) is a fin-and-tube dehumidification module, for example, and cools and dehumidifies the target air (outdoor air (OA)) with the refrigerant. In particular, the refrigerant-cooling-based dehumidification module (48) is located upstream of the liquid-based dehumidification module (21) in the flow direction of the outdoor air (OA). The refrigerant-cooling-based dehumidification module (48) cools and dehumidifies the target air (outdoor air (OA)) before being dehumidified in the liquid-based dehumidification module (21). That is, in the first embodiment, the target air (outdoor air (OA)) is dehumidified in both of the liquid-based dehumidification module (21) and the refrigerant-cooling-based dehumidification module (48), and then supplied to the room as supply air (SA).

A drain pan (48a) is disposed below the refrigerant-cooling-based dehumidification module (48). In the refrigerant-cooling-based dehumidification module (48), the moisture absorbed from the target air (outdoor air (OA)) while cooling and dehumidifying the target air is condensed on the surface of the refrigerant-cooling-based dehumidification module (48), and falls downward. The drain pan (48a) is a pan collecting the condensed water. The drain pan (48a) is connected to a drainage pipe (48b), and discharges the condensed water to the outside of the humidity control apparatus (10) through the drainage pipe (48b).

In this way, the drain pan (48a) is provided separately from the liquid tank (24) of the liquid-based dehumidification module (21). If the condensed water were mixed in the liquid tank (24), the concentration of the liquid absorbent in the liquid tank (24) would further decrease than that with no condensed water mixed therein, and the energy required for the recovery module (31) to recover the liquid absorbent would increase. However, since the drain pan (48a) and the liquid tank (24) are separately provided, such a problem is less likely to occur.

Further, a filter (49) is located between the refrigerant-cooling-based dehumidification module (48) and the liquid-based dehumidification module (21). The filter (49) blocks the liquid absorbent from scattering toward the refrigerant-cooling-based dehumidification module (48) from the liquid-based dehumidification module (21), and also blocks the condensed water from scattering toward the liquid-based dehumidification module (21) from the refrigerant-cooling-based dehumidification module (48). This filter (49) reliably lowers the possibility that the liquid absorbent and the condensed water are mixed together.

The condensed water is discharged to the outside through the drain pan (48a) and the drainage pipe (48b). Thus, an additional heat dissipation means is required to dissipate the condensation heat generated during the cooling and dehumidification of the outdoor air (OA) by the refrigerant-cooling-based dehumidification module (48). In the first embodiment, the heat dissipation condenser (43) is provided as the means for dissipating the condensation heat. In particular, the heat dissipation condenser (43) dissipates heat to the heat dissipation fluid other than the room air (RA) as described above, to recover the heat of vaporization corresponding to the condensed water discharged to the outside. This can keep the condensation temperature (condensation pressure) of the refrigerant from excessively increasing, and thus, can avoid a situation in which the humidity control apparatus (10) stops operating based on a determination that an excessive rise in the condensation temperature (condensation pressure) is an abnormal event.

As can be seen, the liquid-cooling heat exchanger (46) and the refrigerant-cooling-based dehumidification module (48) are connected to the single refrigerant circuit (40) together with the liquid-heating heat exchanger (44). In the first embodiment, the refrigerant circuit (40), which can be referred to as a heat pump heat source, has a simple configuration because the refrigerant circuit (40) does not have a complicated combination of a plurality of circuits.

The dehumidification module (20) of the humidity control apparatus (10) according to the first embodiment includes the refrigerant-cooling-based dehumidification module (48) and the liquid-based dehumidification module (21) as described above. Therefore, even if a liquid having relatively low hygroscopic performance, such as an ionic liquid, is used as the liquid absorbent, and even if the air-conditioning load is relatively high, the target air sufficiently dehumidified by the two modules (48, 21) is supplied to the room. Further, since the two modules (48, 21) dehumidifying the target air are provided, it is possible to adjust the ratio between the amount of dehumidification by the refrigerant-cooling-based dehumidification module (48) and the amount of dehumidification by the liquid-based dehumidification module (21) in a design phase or a control phase. Thus, it can be said that the degree of design freedom is high.

On the other hand, there is only the recovery module (31) of the liquid absorbent on the recovery side of the humidity control apparatus (10). No module using other substance than the liquid absorbent, such as the refrigerant-cooling-based dehumidification module, is provided. That is, it can be said that the recovery side is further simplified than the dehumidification side.

—Relationship between Air Flow Direction and Liquid Flow Direction in Liquid Dehumidification Module (21)—

Figure 2:
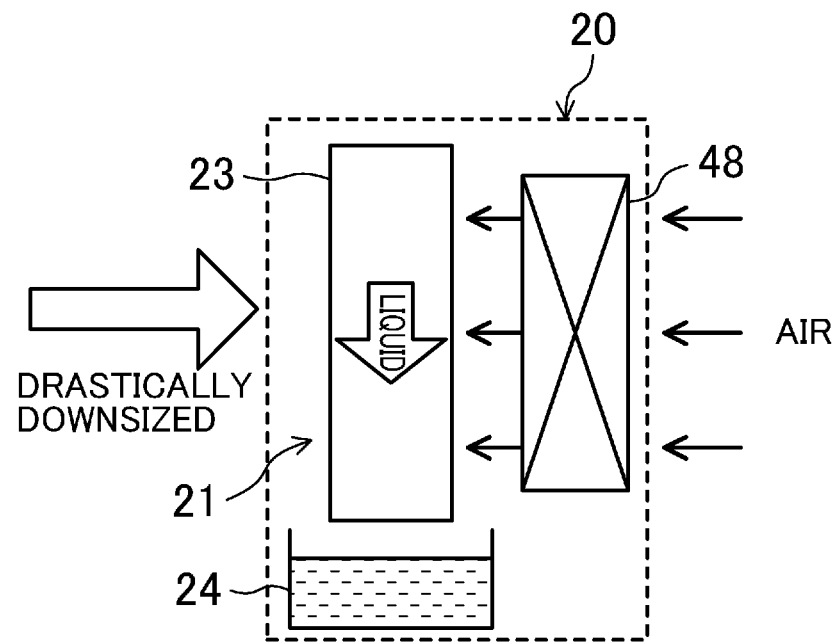
FIG. 2 is a diagram illustrating a liquid-based dehumidification module of the first embodiment in which the flow direction of a liquid absorbent and the flow direction of air coming into contact with the liquid absorbent are orthogonal to each other.

As can be seen, in the dehumidification-side gas-liquid contact portion (23) of the liquid-based dehumidification module (21), the liquid absorbent makes contact with the target air (outdoor air (OA)) that has passed through the refrigerant-cooling-based dehumidification module (48), so that the outdoor air (OA) is further dehumidified. As shown in FIG. 2, the liquid absorbent flows from top to bottom (i.e., in a dripping direction) in the dehumidification-side gas-liquid contact portion (23), whereas the outdoor air (OA) coming into contact with the liquid absorbent flows from the refrigerant-cooling-based dehumidification module (48) toward the liquid-based dehumidification module (21) (from right to left in FIG. 1). That is, in the dehumidification-side gas-liquid contact portion (23), the flow direction of the liquid absorbent and the flow direction of the outdoor air (OA) intersect with each other (specifically, they are orthogonal to each other).

Figure 3:
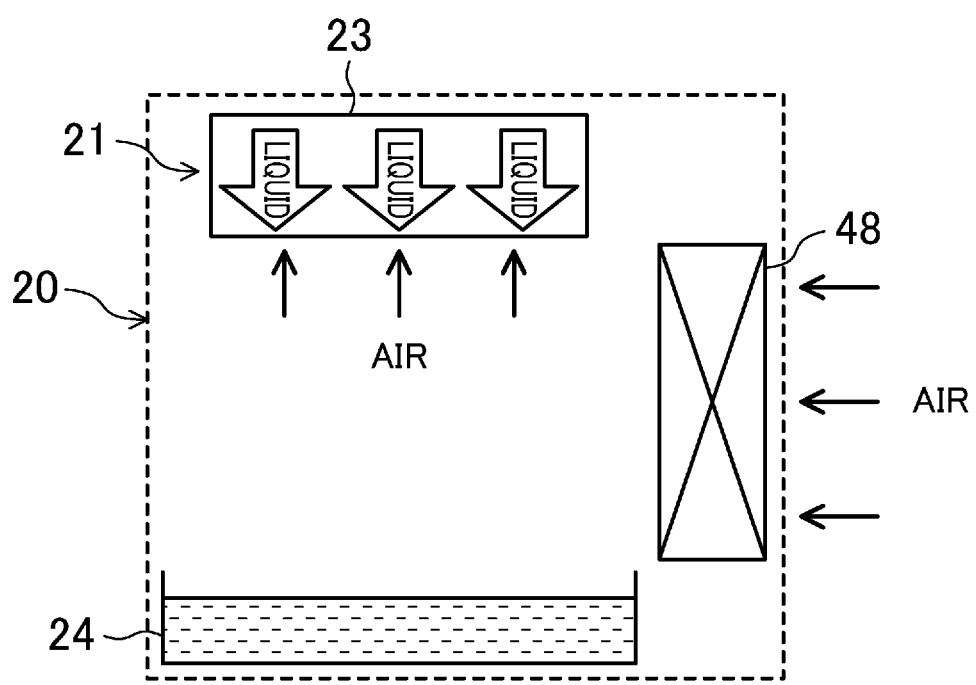
FIG. 3 is a diagram illustrating a conventional liquid-based dehumidification module in which the flow direction of the liquid absorbent and the flow direction of the air coming in contact with the liquid absorbent are opposed to each other.

FIG. 3 shows the flow direction of the liquid absorbent and the flow direction of the outdoor air (OA) according to a conventional example. As shown in FIG. 3, in the conventional example, the liquid absorbent in the dehumidification-side gas-liquid contact portion (23) flows from top to bottom (dripping direction), just like in the first embodiment shown in FIG. 2. However, the outdoor air (OA) coming into contact with the liquid absorbent flows in a direction opposite to the flow direction of the liquid absorbent, i.e., from bottom to top. Specifically, in FIG. 3, the flow of the liquid absorbent and the flow of the outdoor air (OA) are counter flows.

Suppose that the same volume of the outdoor air (OA) passes through the refrigerant-cooling-based dehumidification module (48) in the examples of FIGS. 2 and 3. In order to reduce the pressure loss of the outdoor air (OA) in the dehumidification-side gas-liquid contact portion (23), it is conceivable to reduce the velocity of the outdoor air (OA) to be received by the dehumidification-side gas-liquid contact portion (23). One of conceivable measures is increasing the area of the surface of the dehumidification-side gas-liquid contact portion (23) receiving the outdoor air (OA).

When the counter flows are generated as shown in FIG. 3 (conventional example), it is difficult to reduce the installation area of the liquid-based dehumidification module (21) in view of ensuring the area of the surface of the dehumidification-side gas-liquid contact portion (23) receiving the outdoor air (OA). Therefore, in the conventional example shown in FIG. 3, downsizing of dehumidification module (20) cannot be expected.

In contrast, when the flows are orthogonal to each other as shown in FIG. 2 (the present embodiment), narrowing the width of the dehumidification-side gas-liquid contact portion (23) in the passage direction (vertical direction) of the outdoor air (OA) can reduce the installation area of the liquid-based dehumidification module (21). Thus, the dehumidification module (20) can be downsized.

In addition, in the case of FIG. 3 where the counter flows are generated (conventional example), even if only the width of the dehumidification-side gas-liquid contact portion (23) in the passing direction (vertical direction) of the outdoor air (OA) is reduced to downsize the dehumidification-side gas-liquid contact portion (23), the flow rate of the liquid absorbent does not vary so much because the flow velocity necessary for the diffusion of the liquid absorbent needs to be maintained.

In contrast, when the flows are orthogonal to each other (present embodiment), as shown in FIG. 2, reducing the width of the dehumidification-side gas-liquid contact portion (23) in the passage direction (lateral direction) of the outdoor air (OA) reduces the width of the flow path of the liquid absorbent, thereby increasing the flow velocity of the liquid absorbent. This can downsize the dehumidification-side gas-liquid contact portion (23), while reducing the required flow rate of the liquid absorbent.

As can be seen, in this embodiment, the dehumidification module (20) can be further downsized than the conventional one. Further, since the flow rate of the liquid absorbent can be reduced, the power of the pump (37) shown in FIG. 1 can be made smaller than that required in the example shown in FIG. 3.

—Controller—

The controller (50) is a microcomputer including a memory and a CPU, and is electrically connected to various components of the humidity control apparatus (10) (the compressor (42), the pump (37), the flow control valve (39), the fan (43a), and the expansion valve (45)). The CPU reads and executes the program stored in the memory, so that the controller (50) controls the operation of the various components connected thereto.

Specifically, the controller (50) according to the first embodiment controls the operation of the fan (43a) based on the condensation temperature of the refrigerant, and controls the opening degree of each valve (39, 45) and the operation of the pump (37) based on the air-conditioning load. Next, a supply control unit (51), which is one of functional units included in the controller (50) and controls the operation of the fan (43a), will be described below.

—Supply Control Unit—

When the condensation temperature of the refrigerant in the refrigerant circuit (40) exceeds a predetermined value, the supply control unit (51) operates the fan (43a) to supply the heat dissipation condenser (43) with the outdoor air (OA) which is the heat dissipation fluid. In this case, the heat dissipation condenser (43) releases the heat of the refrigerant to the outdoor air (OA) supplied thereto.

On the other hand, when the condensation temperature of the refrigerant in the refrigerant circuit (40) is equal to or less than the predetermined value, the supply control unit (51) stops the operation of the fan (43a) to stop the supply of the outdoor air (OA) to the heat dissipation condenser (43). In this case, the heat of the refrigerant is not dissipated to the outdoor air (OA) in the heat dissipation condenser (43).

If the fan (43a) is operated when the condensation temperature of the refrigerant is equal to or less than the predetermined value, the refrigerant dissipates heat to the outdoor air (OA) in the heat dissipation condenser (43) even though the condensation temperature of the refrigerant is relatively low. Then, the degree of heating of the liquid absorbent in the liquid-heating heat exchanger (44) is lowered, and the liquid absorbent cannot be sufficiently recovered. For this reason, when the condensation temperature of the refrigerant is equal to or less than the predetermined value, the supply control unit (51) performs control such that no outdoor air (OA) is supplied to the heat dissipation condenser (43). This control can avoid insufficient recovery of the liquid absorbent, and can keep the dehumidification capacity of the humidity control apparatus (10) from decreasing.

When the air-conditioning load is relatively small and the amount of heat generated in the refrigerant-cooling-based dehumidification module (48) (condensation heat) is small, the heat generated in the dehumidification module (20) can be sufficiently handled through the heat dissipation to the air used for the recovery in the recovery module (31). Thus, the condensation temperature of the refrigerant is relatively lowered. When the condensation temperature of the refrigerant is equal to or less than the predetermined value, the fan (43a) of the humidity control apparatus (10) is stopped to save the power consumption of the fan (43a).

<Operation of Humidity Control Apparatus>

The dehumidification operation of the humidity control apparatus (10) according to the first embodiment will be described below.

In the refrigerant circuit (40), the compressor (42) is operated; the heat dissipation condenser (43) and the liquid-heating heat exchanger (44) function as refrigerant condensers; and the liquid-cooling heat exchanger (46) and the refrigerant-cooling-based dehumidification module (48) function as refrigerant evaporators.

The refrigerant compressed in the compressor (42) is condensed through dissipation of heat to the heat dissipation fluid (outdoor air (OA)) in the heat dissipation condenser (43), and then further condensed through dissipation of heat to the liquid absorbent in the liquid-heating heat exchanger (44). The refrigerant which has flowed out of the liquid-heating heat exchanger (44) is decompressed by the expansion valve (45), and flows into the liquid-cooling heat exchanger (46).

In the liquid-cooling heat exchanger (46), the refrigerant absorbs heat from the liquid absorbent to cool the liquid absorbent. Thereafter, the refrigerant flows into the refrigerant-cooling-based dehumidification module (48) and absorbs moisture from the target air (outdoor air (OA)) passing through the module (48) to evaporate, thereby cooling and dehumidifying the air. The refrigerant that has passed through the refrigerant-cooling-based dehumidification module (48) is sucked into the compressor (42).

In the absorbent circuit (15), the pump (37) is operated, and the flow control valve (39) is opened to a predetermined opening degree. In the liquid-based dehumidification module (21), the liquid absorbent is dripped from the dehumidification-side liquid feeder (22) to the dehumidification-side gas-liquid contact portion (23). The target air (outdoor air (OA)) cooled and dehumidified in the refrigerant-cooling-based dehumidification module (48) is supplied to the dehumidification-side gas-liquid contact portion (23), and the dripped liquid absorbent absorbs moisture from the air to dehumidify the air. The air which has been dehumidified in both of the refrigerant-cooling-based dehumidification module (48) and the liquid-based dehumidification module (21) is supplied to the room as the supply air (SA).

The liquid absorbent that has absorbed moisture from the target air (outdoor air (OA)) has its concentration lowered, and is stored in the liquid tank (24) located below the dehumidification-side gas-liquid contact portion (23). The liquid absorbent in the liquid tank (24) flows through the connection pipe (15d), and is diverged into the liquid-heating heat exchanger (44) and the liquid-cooling heat exchanger (46) via the connection pipe (15e).

The liquid absorbent that has flowed into the liquid-heating heat exchanger (44) is heated by the refrigerant in the heat exchanger (44), and then flows into the recovery module (31). The liquid absorbent that has flowed into the recovery module (31) is dripped from the recovery-side liquid feeder (32) to the recovery-side gas-liquid contact portion (33). The recovery air (room air (RA)) is supplied to the recovery-side gas-liquid contact portion (33), and the dripped liquid absorbent releases the moisture to the air. As a result, the liquid absorbent is increased in concentration, and is recovered. The recovered liquid absorbent is temporarily received by the recovery-side liquid receiver (34) below the recovery-side gas-liquid contact portion (33), and is then stored in the liquid tank (24) after passing through the connection pipe (15c). That is, in the liquid tank (24), the liquid absorbent that has had its concentration increased in the recovery module (31) and the liquid absorbent that has had its concentration decreased in the liquid-based dehumidification module (21) are mixed together.

The air used for the recovery of the liquid absorbent is discharged to the outside as exhaust air (EA).

The liquid absorbent that has flowed into the liquid-cooling heat exchanger (46) is cooled by the refrigerant in the heat exchanger (46), and then flows into the liquid-based dehumidification module (21). The liquid absorbent that has flowed into the liquid-based dehumidification module (21) is dripped again from the dehumidification-side liquid feeder (22) to the dehumidification-side gas-liquid contact portion (23).

<Liquid Absorbent in Liquid Tank>

As described above, the liquid absorbent which has been recovered and had its concentration increased and the liquid absorbent which has been used for dehumidification and had its concentration decreased are contained and mixed in the liquid tank (24). The mixture of the liquid absorbents circulates in the absorbent circuit (15) as described above. However, in the first embodiment, the dehumidification capacity is less likely to be lowered through the mixing of the absorbents. This is due to the following reasons.

As described above, the dehumidification module (20) is configured to dehumidify the target air (outdoor air (OA)) in two stages using the two modules, namely, the liquid-based dehumidification module (21) and the refrigerant-cooling-based dehumidification module (48). In particular, the liquid-based dehumidification module (21), which is positioned downstream in the flow direction of the target air, further dehumidifies the outdoor air (OA) that has been cooled and dehumidified in the refrigerant-cooling-based dehumidification module (48). Therefore, the dehumidification amount of the liquid-based dehumidification module (21) is lower than that in the case where no refrigerant-cooling-based dehumidification module (48) is provided, and the concentration of the liquid absorbent in the liquid-based dehumidification module (21) differs by only about 1% or less before and after dripping.

Further, since the target air (outdoor air (OA)) is dehumidified in two stages, the amount of liquid absorbent used in the dehumidification operation by the liquid-based dehumidification module (21) is smaller than that in the case where the refrigerant-cooling-based dehumidification module (48) is not provided and the dehumidification is performed only by the liquid-based dehumidification module. Therefore, the amount of liquid absorbent that flows into the liquid tank (24) after having its concentration varied in the liquid-based dehumidification module (21) naturally decreases.

In view of the foregoing, even if the liquid absorbent which has been recovered and had its concentration increased and the liquid absorbent which has been used for the dehumidification and had its concentration decreased are mixed together in the liquid tank (24), it can be said that the degree of change in the concentration due to the mixing is very small. In the first embodiment in which the mixture of the liquid absorbents is used for the dehumidification in the liquid-based dehumidification module (21), the dehumidification capacity is comparable to that in the case where the liquid absorbent immediately after the recovery in the recovery module (31) is directly used for the dehumidification in the liquid-based dehumidification module (21).

Therefore, unlike the case where separate liquid tanks are respectively provided for the liquid-based dehumidification module (21) and the recovery module (31), the liquid tank (24) to be shared between the liquid-based dehumidification module (21) and the recovery module (31) can be provided without increasing the size of the liquid tank itself, as described in the first embodiment. Provision of the single liquid tank (24) which is not upsized makes it possible to downsize the humidity control apparatus (10). Further, the manufacturing cost of the humidity control apparatus (10) can be reduced because only one liquid tank (24) is used.

<Advantages>

In the first embodiment, the liquid absorbent is cooled by the refrigerant in the liquid-cooling heat exchanger (46), and then supplied to the liquid-based dehumidification module (21). In the liquid-based dehumidification module (21), the liquid absorbent absorbs moisture from the target air (outdoor air (OA)) to dehumidify the air. The liquid absorbent is heated by the refrigerant in the liquid-heating heat exchanger (44), and then supplied to the recovery module (31). In the recovery module (31), the liquid absorbent that has absorbed moisture from the target air and had its concentration reduced in the liquid-based dehumidification module (21) is recovered by releasing the moisture in the air for recovery.

In particular, according to the first embodiment, the target air (outdoor air (OA)) is first cooled and dehumidified by the refrigerant in the refrigerant-cooling-based dehumidification module (48), dehumidified in the liquid-based dehumidification module (21), and then supplied to the room. Thus, regardless of the degree of the hygroscopic performance of the liquid absorbent, the target air can be sufficiently dehumidified without intentionally increasing the contact area between the liquid absorbent and the air in the liquid-based dehumidification module (21). That is, according to the first embodiment, the kind of usable liquid absorbent increases.

Moreover, the dehumidification is performed in the first stage by the refrigerant-cooling-based dehumidification module (48), and in the second stage by the liquid-based dehumidification module (21). Thus, the amount of the liquid absorbent can be further reduced than that in the case where the dehumidification is performed using the liquid absorbent alone, and in addition, it is not necessary to upsize the liquid tank (24). This can reduce the size and cost of the humidity control apparatus (10). Further, since the evaporation temperature in the refrigerant-cooling-based dehumidification module (48) in the first stage can be made higher than that in the case where the dehumidification is performed using the refrigerant-cooling-based dehumidification module alone. This can achieve good dehumidification efficiency. Since the dehumidification is performed in two stages, the dehumidification amount in the liquid-based dehumidification module (21) is kept from increasing as compared to the case where the dehumidification is performed using the liquid-based dehumidification module alone. This can reduce energy required for the recovery.

In addition, the refrigerant-cooling-based dehumidification module (48), the liquid-cooling heat exchanger (46), and the liquid-heating heat exchanger (44) are connected to the single refrigerant circuit (40). Therefore, the degree of dehumidification can be controlled by, for example, changing the circulation amount of the refrigerant.

In the first embodiment, the heat dissipation condenser (43) is provided. The heat dissipation condenser (43) dissipates the heat of the refrigerant that has passed through the refrigerant-cooling-based dehumidification module (48) to a substance other than the air in the room. Thus, heat generated in the refrigerant-cooling-based dehumidification module (48) can be dissipated, which can keep the condensation temperature of the refrigerant from increasing. Therefore, it is possible to avoid stopping of the dehumidification operation due to deterioration or abnormality in the dehumidification efficiency of the entire humidity control apparatus (10) accompanying the increase in the condensation temperature of the refrigerant.

In the first embodiment, when the air-conditioning load is relatively small and the amount of heat (condensation heat) generated in the refrigerant-cooling-based dehumidification module (48) is small, the heat (adsorption heat) generated in the refrigerant-cooling-based dehumidification module (48) can be sufficiently handled through the heat dissipation to the air used for the recovery in the recovery module (31). Thus, the condensation temperature of the refrigerant is relatively lowered. In the first embodiment, when the condensation temperature of the refrigerant is equal to or less than the predetermined value, the fan (43a) is stopped to stop the supply of the outdoor air (OA) to the heat dissipation condenser (43). Therefore, as compared to the case where the heat dissipation condenser (43) performs the heat exchange operation when the condensation temperature of the refrigerant is equal to or less than the predetermined value, the recovery temperature of the liquid absorbent increases, and the liquid absorbent is sufficiently recovered. Further, since the supply of the heat dissipation fluid to the heat dissipation heat exchanger (43) is stopped, the power consumption of the fan (43a) is saved.

Second Embodiment

<Configuration>

Figure 4:
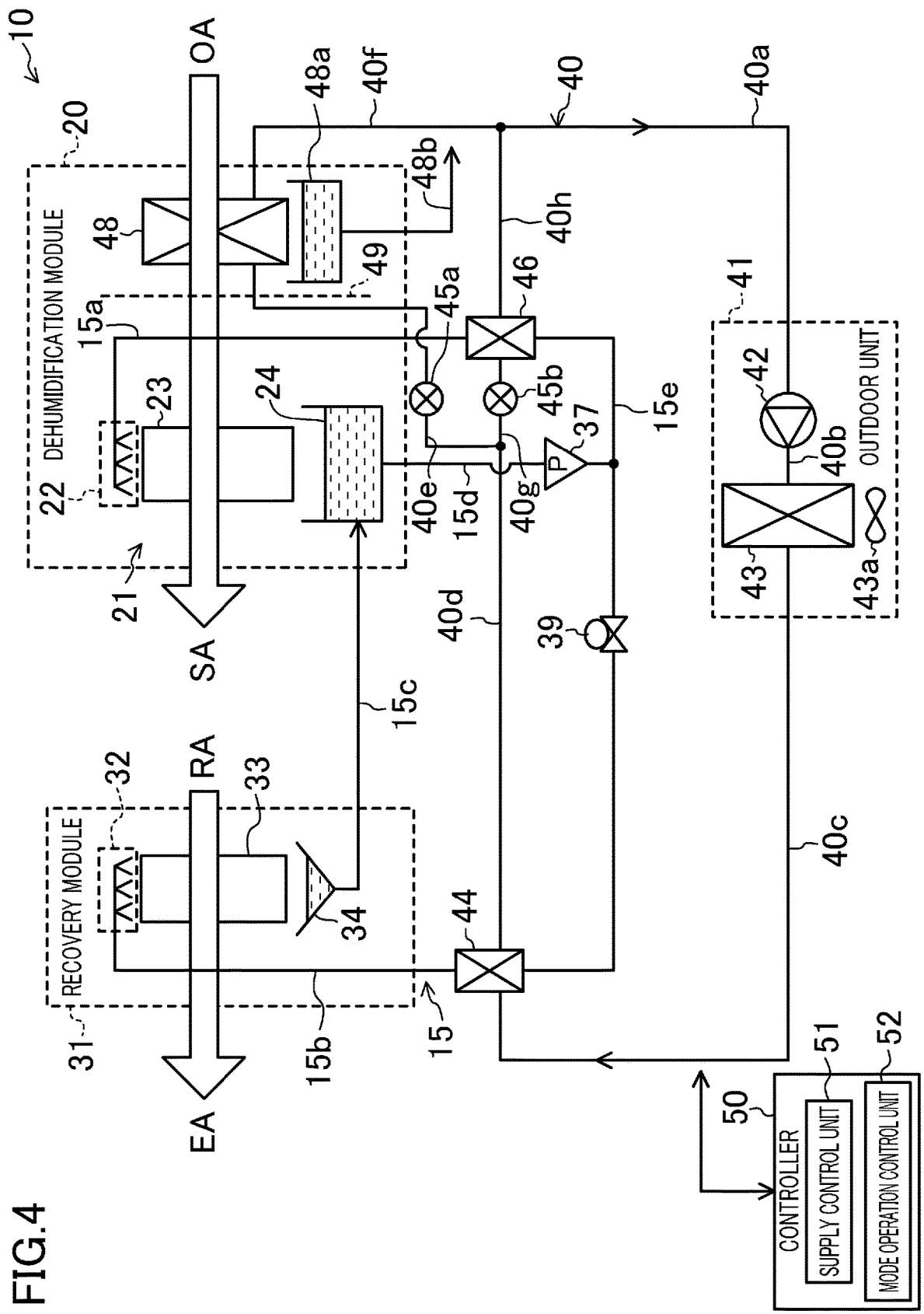
FIG. 4 is a diagram schematically illustrating the configuration of a humidity control apparatus of a second embodiment.

FIG. 4 shows the configuration of a humidity control apparatus (10) of a second embodiment. In FIG. 4, the absorbent circuit (15) is configured in the same manner as that shown in FIG. 1, but the refrigerant circuit (40) is configured slightly differently from that shown in FIG. 1. In FIG. 4, like reference characters shown in FIG. 1 denote components corresponding to those of FIG. 1. In the following description, only the components different from those of FIG. 1 will be focused on.

The same liquid absorbent as that described in the first embodiment is used.

—Refrigerant Circuit—

The refrigerant circuit (40) includes a compressor (42), a heat dissipation condenser (43), a liquid-heating heat exchanger (44), a first expansion valve (45a), a second expansion valve (45b), a liquid-cooling heat exchanger (46), and a refrigerant-cooling-based dehumidification module (48) connected together by connection pipes (40a to 40h). A fan (43a) is disposed near the heat dissipation condenser (43).

The refrigerant circuit according to the second embodiment is configured in the same manner as that of the first embodiment shown in FIG. 1 except that the connection between the liquid-cooling heat exchanger (46) and the refrigerant-cooling-based dehumidification module (48) is different from that shown in FIG. 1.

—First and Second Expansion Valves—

One end of the connection pipe (40d) is connected to a refrigerant outlet of the liquid-heating heat exchanger (44). The other end of the connection pipe (40d) is connected to one end of the connection pipe (40e) and one end of the connection pipe (40g). That is, the path through which the refrigerant flows is branched into two from the other end of the connection pipe (40d). The first expansion valve (45a) is connected to the connection pipe (40e) which is one of the branched paths, and the second expansion valve (45b) is connected to the connection pipe (40g) which is the other branched path.

Each of the first expansion valve (45a) and the second expansion valve (45b) is an electronic expansion valve. The first expansion valve (45a) and the second expansion valve (45b) decompress the refrigerant circulating in the refrigerant circuit (40) by changing their opening degrees, and also adjust the flow rate of the refrigerant flowing through the connection pipes (40e, 400 and the connection pipes (40g, 40h).

The other end of the connection pipe (40e) is connected to the refrigerant inlet of the refrigerant-cooling-based dehumidification module (48), and the other end of the connection pipe (40g) is connected to the inlet of the refrigerant passage of the liquid-cooling heat exchanger (46). The first expansion valve (45a) and the refrigerant-cooling-based dehumidification module (48) are connected in parallel to the second expansion valve (45b) and the liquid-cooling heat exchanger (46). Accordingly, the refrigerant that has been decompressed, and had its inflow amount adjusted, by the first expansion valve (45a) flows into the refrigerant-cooling-based dehumidification module (48), and the refrigerant that has been decompressed, and had its inflow amount adjusted, by the second expansion valve (45b) flows into the liquid-cooling heat exchanger (46).

—Controller—

The humidity control apparatus (10) of the second embodiment includes a controller (50). The controller (50) functions as a supply control unit (51) for controlling the operation of the fan (43a), and also functions as a mode operation control unit (52) described below.

—Mode Operation Control Unit—

Depending on the magnitude of the air-conditioning load, the target air can be sufficiently dehumidified only by the liquid-based dehumidification module (21) without using the refrigerant-cooling-based dehumidification module (48), and vice versa. For example, if both of the liquid-based dehumidification module (21) and the refrigerant-cooling-based dehumidification module (48) are used for the dehumidification as described in the first embodiment in the case where only a sensible heat load needs to be handled, energy is consumed not only in the handling of the sensible heat load, but also in the handling of a latent heat load. In the configuration of the first embodiment, it is difficult to adjust the ratio between the energy consumed in the handling of the latent heat load and the energy consumed in the handling of the sensible heat load.

Therefore, as shown in FIG. 5, the mode operation control unit (52) controls the absorbent circuit (15) and the refrigerant circuit (40) so that the operation mode of the humidity control apparatus (10) is switched to one of the following five modes, mainly in accordance with the state of the air-conditioning load. This control can stop the operation of the pump (37) and the compressor (42) when the operation the pump (37) and the compressor (42) are unnecessary, and the power consumption of these components (37, 42) can be saved.

(First Operation Mode) The target air is dehumidified by both of the liquid-based dehumidification module (21) and the refrigerant-cooling-based dehumidification module (48), and the refrigerant circulates in the refrigerant circuit (40).

(Second Operation Mode) The target air is dehumidified only by the liquid-based dehumidification module (21), and the refrigerant circulates in the refrigerant circuit (40).

(Third Operation Mode) The target air is dehumidified only by the liquid-based dehumidification module (21), and the refrigerant does not circulate and the liquid absorbent circulates in the absorbent circuit (15).

(Fourth Operation Mode) The target air is dehumidified only by the refrigerant-cooling-based dehumidification module (48), and the liquid absorbent does not circulate in the absorbent circuit (15).

(Fifth Operation Mode) The target air is dehumidified by both of the refrigerant-cooling-based dehumidification module (48) and the liquid-based dehumidification module (21), and the absorbent circulates in the absorbent circuit (15) without being heated and cooled.

The first and fifth operation modes correspond to a first dehumidification operation mode. The second and third operation modes correspond to a second dehumidification operation mode. The fourth operation mode corresponds to a third dehumidification operation mode.

As shown in FIG. 5, the first operation mode is selected in a high load state in which the air-conditioning load is equal to or more than a first predetermined load. In the first operation mode, the outdoor air (OA) is dehumidified by both of the dehumidification modules (21, 48). Thus, this is suitable for the case where both of the latent heat load and the sensible heat load are high.

The second operation mode is selected in a mid-load state in which the air-conditioning load is below the first predetermined load, and is equal to or more than a second predetermined load which is lower than the first predetermined load. In the second operation mode, the outdoor air (OA) is neither cooled nor dehumidified by the refrigerant-cooling-based dehumidification module (48), but is dehumidified by the liquid-based dehumidification module (21). Thus, this is suitable for the case where the sensible heat load is not so high, but the latent heat load is high.

The third operation mode is selected in a low load state in which the air-conditioning load is below the second predetermined load.

In the fourth operation mode, the target air (outdoor air (OA)) is not dehumidified by the liquid-based dehumidification module (21), but is cooled and dehumidified only by the refrigerant-cooling-based dehumidification module (48). Therefore, the fourth operation mode is selected when the sensible heat load is high, but the latent heat load is not so high, that is, when the sensible heat load needs to be actively handled. The fourth operation mode is also suitable for the start-up of the humidity control apparatus (10), for example.

The fifth operation mode is selected when the liquid absorbent immediately before being used for the dehumidification in the dehumidification module (20) has a relatively high concentration, and does not need to be intentionally cooled in the liquid-cooling heat exchanger (46) immediately before the dehumidification.

The air-conditioning load can be calculated based on the temperature and humidity of the target air (outdoor air (OA)) at the inlet of the dehumidification module (20), and the target temperature and target humidity of the room. As an example, the sensible heat load may be calculated from the difference between the target temperature and the temperature of the outdoor air (OA) at the inlet, and the latent heat load may be calculated from the difference between the target humidity and the humidity of the outdoor air (OA) at the inlet.

As described above, switching the operation mode mainly according to the air-conditioning load can appropriately change the level of priority given to the handing of the latent heat load and the handing of the sensible heat load.

<Operation of Humidity Control Apparatus>

How the humidity control apparatus (10) is operated in each of the first to fifth operation modes will be described below with reference to FIGS. 6 to 10.

—First Operation Mode—

In the refrigerant circuit (40), the refrigerant is diverged into the liquid-cooling heat exchanger (46) and the refrigerant-cooling-based dehumidification module (48).

Figure 6:
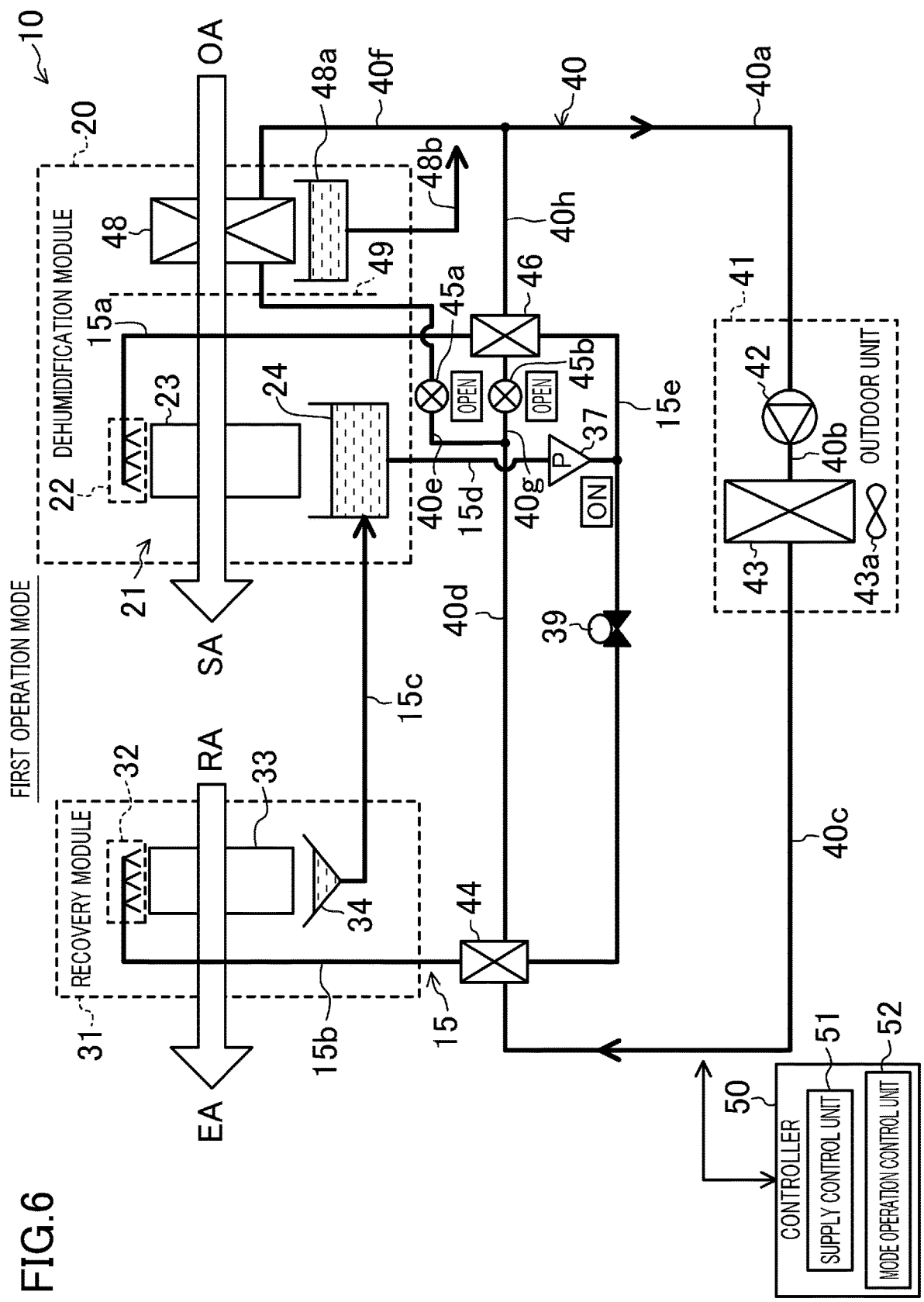
FIG. 6 is a diagram illustrating how the liquid absorbent and the refrigerant flow when the humidity control apparatus of the second embodiment is operated in the first operation mode.

Specifically, as shown in FIG. 6, in the refrigerant circuit (40), the compressor (42) is operated; the heat dissipation condenser (43) and the liquid-heating heat exchanger (44) function as refrigerant condensers; and the liquid-cooling heat exchanger (46) and the refrigerant-cooling-based dehumidification module (48) function as refrigerant evaporators. Both of the first expansion valve (45a) and the second expansion valve (45b) are opened to a predetermined opening degree.

The refrigerant compressed in the compressor (42) is condensed through dissipation of heat to the heat dissipation fluid (outdoor air (OA)) in the heat dissipation condenser (43), and is then further condensed through dissipation of heat to the liquid absorbent in the liquid-heating heat exchanger (44). The refrigerant that has flowed out of the liquid-heating heat exchanger (44) is diverged into the connection piping (40e) and the connection piping (40g) via the connection piping (40d). Flows of the refrigerant passing through the connection pipes (40e, 40g) are decompressed by the first expansion valve (45a) and the second expansion valve (45b), respectively.

The refrigerant that has been decompressed by the first expansion valve (45a) absorbs moisture from the target air (outdoor air (OA)) passing through the refrigerant-cooling-based dehumidification module (48) to evaporate in this module (48), thereby cooling and dehumidifying the outdoor air. The refrigerant that has been decompressed by the second expansion valve (45b) absorbs heat from the liquid absorbent in the liquid-cooling heat exchanger (46) to evaporate. The refrigerant that has flowed out of the refrigerant-cooling-based dehumidification module (48) and the refrigerant that has flowed out of the liquid-cooling heat exchanger (46) merge together at a junction of the connection pipes (40h, 40f, 40a), and the merged refrigerant is sucked into the compressor (42).

In the absorbent circuit (15), the liquid absorbent is heated and cooled in the liquid-heating heat exchanger (44) and the liquid-cooling heat exchanger (46). Since the absorbent circuit (15) is operated in the same manner as the absorbent circuit (15) of the first embodiment, the description of the operation will not be repeated.

Thus, in the dehumidification module (20), the target air (outdoor air (OA)) is sequentially dehumidified by the refrigerant-cooling-based dehumidification module (48) and the liquid-based dehumidification module (21), and supplied to the room as supply air (SA). In the liquid tank (24), the liquid absorbent that has had its concentration increased in the recovery module (31) and the liquid absorbent that has had its concentration decreased in the liquid-based dehumidification module (21) are mixed together.

The air used for the recovery of the liquid absorbent is discharged to the outside as exhaust air (EA).

—Second Operation Mode—

Figure 7:
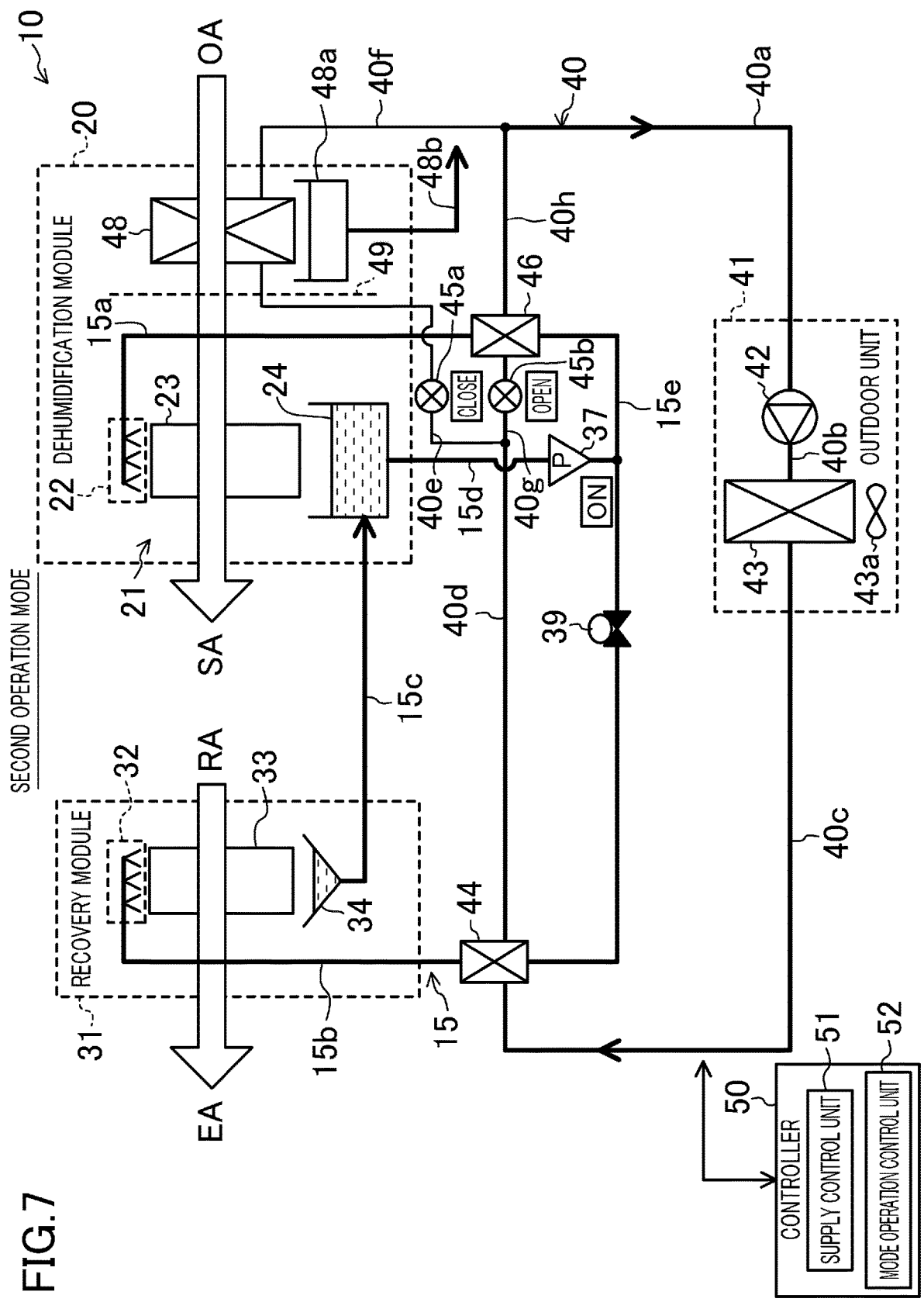
FIG. 7 is a diagram illustrating how the liquid absorbent and the refrigerant flow when the humidity control apparatus of the second embodiment is operated in the second operation mode.

In the refrigerant circuit (40), as shown in FIG. 7, the refrigerant does not flow through the connection pipes (40e, 40f). Thus, the target air (outdoor air (OA)) is neither cooled nor dehumidified in the refrigerant-cooling-based dehumidification module (48), and no condensation water is stored in the drain pan (48a). In the second operation mode, the operation is performed in the same manner as that shown in FIG. 6 except for this feature.

Specifically, in the refrigerant circuit (40), the compressor (42) is operated, the heat dissipation condenser (43) and the liquid-heating heat exchanger (44) function as refrigerant condensers, and the liquid-cooling heat exchanger (46) functions as a refrigerant evaporator. The first expansion valve (45a) is fully closed, and the second expansion valve (45b) is opened to a predetermined opening degree.

The refrigerant compressed in the compressor (42) is condensed through dissipation of heat to the heat dissipation fluid (outdoor air (OA)) in the heat dissipation condenser (43), and is then further condensed through dissipation of heat to the liquid absorbent in the liquid-heating heat exchanger (44). The refrigerant that has flowed out of the liquid-heating heat exchanger (44) does not flow into the connection pipe (40e), but entirely flows into the connection pipe (40g), and is decompressed by the second expansion valve (45b). The refrigerant that has been decompressed absorbs heat from the liquid absorbent in the liquid-cooling heat exchanger (46) to evaporate, and then is sucked into the compressor (42).

In the absorbent circuit (15), the liquid absorbent is heated and cooled in the liquid-heating heat exchanger (44) and the liquid-cooling heat exchanger (46). Since the absorbent circuit (15) is operated in the same manner as the absorbent circuit (15) of the first embodiment, the description of the operation will not be repeated.

Thus, in the dehumidification module (20), the target air (outdoor air (OA)) is dehumidified only by the liquid-based dehumidification module (21), and is supplied to the room as supply air (SA). In the liquid tank (24), the liquid absorbent that has had its concentration increased in the recovery module (31) and the liquid absorbent that has had its concentration decreased in the liquid-based dehumidification module (21) are mixed together.

The air used for the recovery of the liquid absorbent is discharged to the outside as exhaust air (EA).

—Third Operation Mode—

Figure 8:
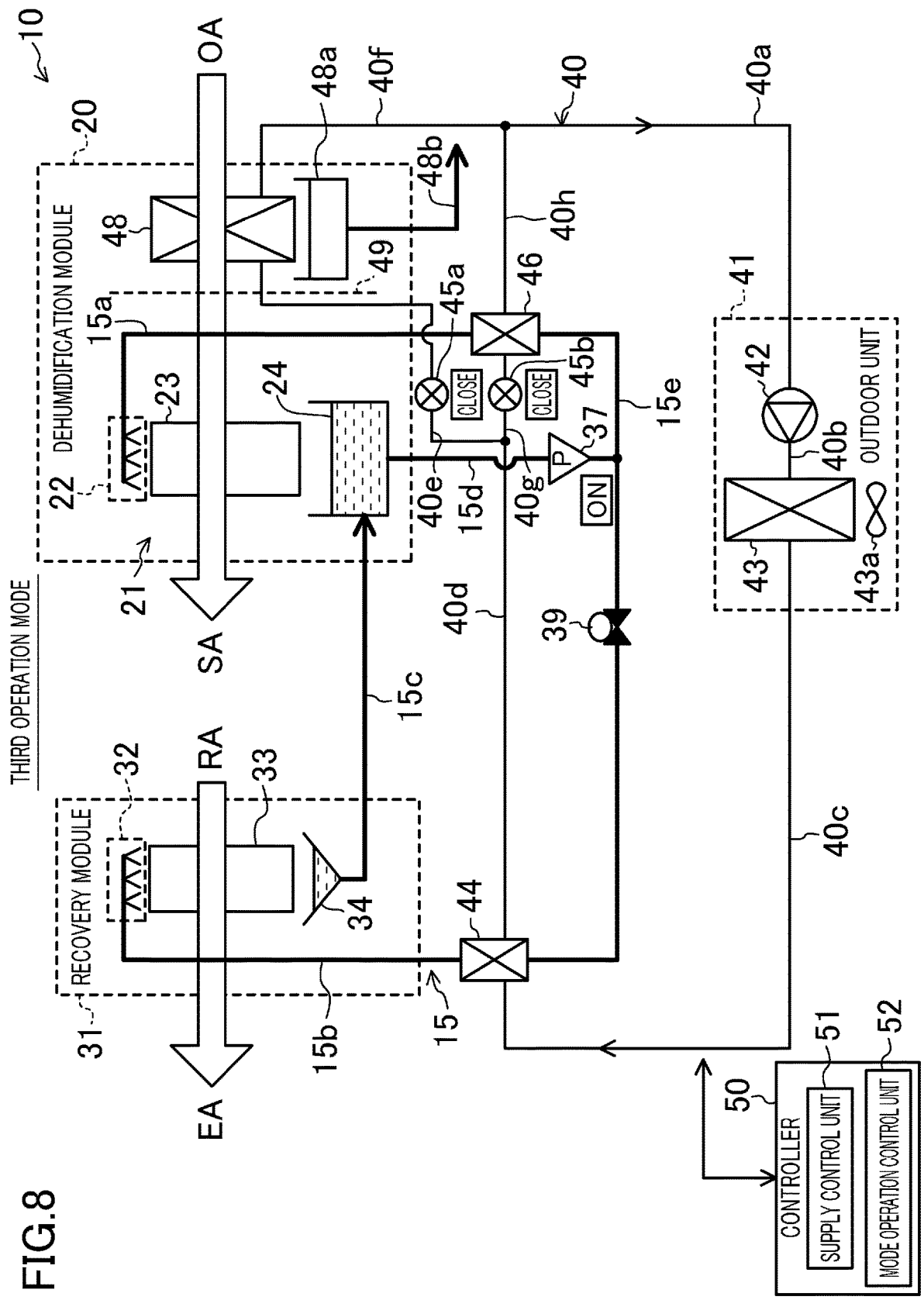
FIG. 8 is a diagram illustrating how the liquid absorbent and the refrigerant flow when the humidity control apparatus of the second embodiment is operated in the third operation mode.

As shown in FIG. 8, in the refrigerant circuit (40), the compressor (42) stops operating, and both of the first expansion valve (45a) and the second expansion valve (45b) are fully closed. Therefore, in the third operation mode, the refrigerant does not circulate in the refrigerant circuit (40), and the refrigerant circuit (40) does not function as the heat pump heat source of the absorbent circuit (15). In the refrigerant-cooling-based dehumidification module (48), the target air (outdoor air (OA)) is neither cooled nor dehumidified, and no condensation water is stored in the drain pan (48a).

In the absorbent circuit (15), the liquid absorbent circulates, but does not exchange heat with the refrigerant. That is, the liquid absorbent is neither heated nor cooled. The target air (outdoor air (OA)) which has been neither cooled nor dehumidified by the refrigerant-cooling-based dehumidification module (48) passes through the liquid-based dehumidification module (21).

Specifically, in the absorbent circuit (15), the pump (37) is operated, and the flow control valve (39) is opened to a predetermined opening degree. In the liquid-based dehumidification module (21), the liquid absorbent is dripped from the dehumidification-side liquid feeder (22) to the dehumidification-side gas-liquid contact portion (23). The target air (outdoor air (OA)) whose humidity has not been controlled by the refrigerant-cooling-based dehumidification module (48) passes through the dehumidification-side gas-liquid contact portion (23), and the dripped liquid absorbent absorbs moisture from the target air to dehumidify the air. The air dehumidified in the liquid-based dehumidification module (21) is supplied to the room as supply air (SA).

The liquid absorbent that has absorbed moisture from the target air (outdoor air (OA)) and had its concentration decreased is once stored in the liquid tank (24), and then flows into the liquid-heating heat exchanger (44) and the liquid-cooling heat exchanger (46).

The liquid absorbent that has flowed into the liquid-heating heat exchanger (44) passes through the heat exchanger (44) without exchanging heat with the refrigerant, and flows into the recovery module (31). The liquid absorbent that has flowed into the recovery module (31) is dripped from the recovery-side liquid feeder (32) to the recovery-side gas-liquid contact portion (33). The liquid absorbent dripped to the recovery-side gas-liquid contact portion (33) releases the moisture to the supplied recovery air (room air (RA)) to have its concentration increased, and thus, is recovered. The liquid absorbent is once received by the recovery-side liquid receiver (34), and is stored in the liquid tank (24) after passing through the connection pipe (15c).

The air used for the recovery of the liquid absorbent is discharged to the outside as exhaust air (EA).

The liquid absorbent flowed into the liquid-cooling heat exchanger (46) passes through the heat exchanger (46) without exchanging heat with the refrigerant, and flows into the liquid-based dehumidification module (21). The liquid absorbent that has flowed into the liquid-based dehumidification module (21) is dripped again from the dehumidification-side liquid feeder (22) to the dehumidification-side gas-liquid contact portion (23).

Thus, in the dehumidification module (20), the target air (outdoor air (OA)) is dehumidified only by the liquid-based dehumidification module (21), and is supplied to the room as supply air (SA). In the liquid tank (24), the liquid absorbent that has had its concentration increased in the recovery module (31) and the liquid absorbent that has had its concentration decreased in the liquid-based dehumidification module (21) are mixed together.

In particular, in the third operation mode, the liquid absorbent is neither heated nor cooled by the refrigerant in the liquid-heating heat exchanger (44) and the liquid-cooling heat exchanger (46). Therefore, the degree of dehumidification of the target air (outdoor air (OA)) in the third operation mode is lower than that in the second operation mode.

—Fourth Operation Mode—

Figure 9:
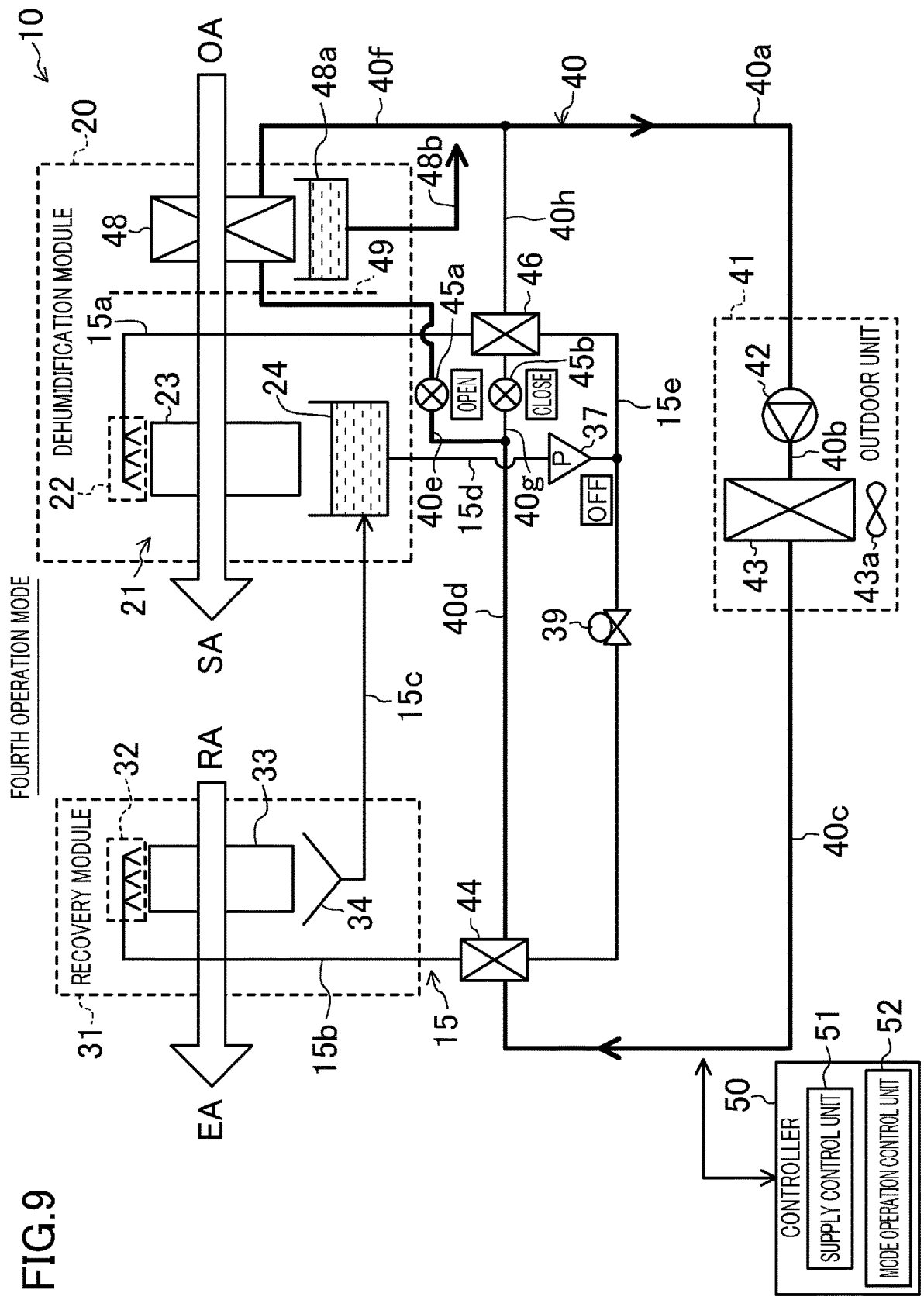
FIG. 9 is a diagram illustrating how the liquid absorbent and the refrigerant flow when the humidity control apparatus of the second embodiment is operated in the fourth operation mode.

As shown in FIG. 9, in the absorbent circuit (15), the pump (37) is not operated, and the liquid absorbent does not circulate in the absorbent circuit (15). Therefore, in the absorbent circuit (15), no dehumidification operation is performed in the liquid-based dehumidification module (21); no recovery operation is performed in the recovery module (31); and no heat exchange between the liquid absorbent and the refrigerant (i.e., heating and cooling of the liquid absorbent) is performed in the heat exchangers (44, 46).

In the refrigerant circuit (40), the compressor (42) is operated; the first expansion valve (45a) is opened to a predetermined opening degree; and the second expansion valve (45b) is fully closed. The refrigerant circulates through the heat dissipation condenser (43), the liquid-heating heat exchanger (44), and the refrigerant-cooling-based dehumidification module (48), but does not flow into the liquid-cooling heat exchanger (46).

Specifically, the refrigerant compressed in the compressor (42) is condensed through dissipation of heat to the target air (outdoor air (OA)) in the heat dissipation condenser (43), and then flows into the liquid-heating heat exchanger (44). Passing through the liquid-heating heat exchanger (44) without exchanging heat with the liquid absorbent, the refrigerant does not flow from the connection pipe (40d) to the connection pipe (40g), but entirely flows from the connection pipe (40d) to the connection pipe (40e), and is decompressed by the first expansion valve (45a). The decompressed refrigerant cools and dehumidifies the target air (outdoor air (OA)) in the refrigerant-cooling-based dehumidification module (48) to evaporate, and then is sucked into the compressor (42).

Thus, the target air (outdoor air (OA)) cooled and dehumidified in the refrigerant-cooling-based dehumidification module (48) is supplied to the room as supply air (SA) without being further dehumidified by the liquid-based dehumidification module (21). In the refrigerant-coolingbased dehumidification module (48), condensed water is stored in the drain pan (48a), and is discharged through the drainage pipe (48b).

Since the liquid absorbent does not circulate in the absorbent circuit (15), no liquid absorbent flows from the modules (21, 31) into the liquid tank (24).

—Fifth Operation Mode—

Figure 10:
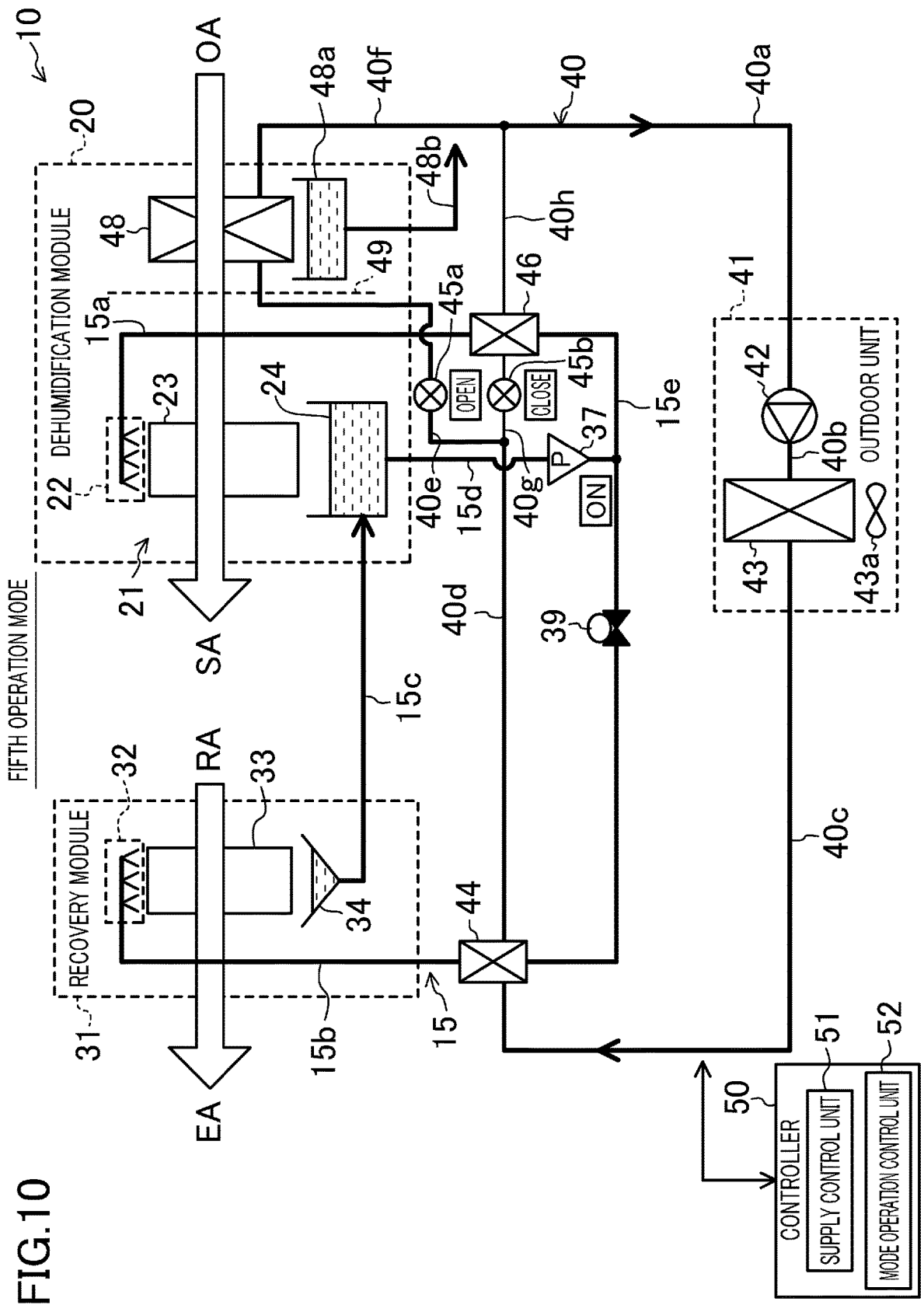
FIG. 10 is a diagram illustrating how the liquid absorbent and the refrigerant flow when the humidity control apparatus of the second embodiment is operated in the fifth operation mode.

As shown in FIG. 10, in the refrigerant circuit (40), the operation is performed in the same manner as in the fourth operation mode shown in FIG. 9. Unlike in the fourth operation mode, a relatively high concentration liquid absorbent circulates in the absorbent circuit (15). In the fifth operation mode, the liquid absorbent is neither heated nor cooled by the refrigerant in the liquid-heating heat exchanger (44) and the liquid-cooling heat exchanger (46). However, since the concentration of the liquid absorbent is relatively high, the dehumidification operation is performed in the liquid-based dehumidification module (21).

Thus, in the dehumidification module (20), the outdoor air (OA) is sequentially dehumidified in the refrigerant-cooling-based dehumidification module (48) and the liquid-based dehumidification module (21), and is supplied to the room as supply air (SA). Thus, the liquid tank (24) stores the relatively high concentration liquid absorbent which continues to circulate.

—Selection of Operation Mode—

In summary, the second and third operation modes may be regarded as modes in which the refrigerant-cooling-based dehumidification module (48) is not used. The third, fourth, and fifth operation modes can be regarded as modes in which the liquid absorbent is not cooled in the liquid-cooling heat exchanger (46).

The refrigerant-cooling-based dehumidification module (48) is suitably used when the temperature of the target air (outdoor air (OA)) at the inlet of the dehumidification module (20) is relatively high. The liquid-cooling heat exchanger (46) is suitably used when the humidity of the target air (outdoor air (OA)) at the inlet of the dehumidification module (20) is relatively high, and the dehumidification operation using the liquid absorbent is required.

Accordingly, when both of the temperature and humidity of the room are high, it can be said that the first operation mode is desirable in which the target air (outdoor air (OA)) is cooled and dehumidified in the refrigerant-cooling-based dehumidification module (48), and in addition, the liquid absorbent before being used for the dehumidification in the liquid-based dehumidification module (21) is dehumidified in the liquid-cooling heat exchanger (46).

Advantages

The humidity control apparatus (10) according to the second embodiment has the following advantages in addition to those of the first embodiment.

In the second embodiment, the mode operation control unit (52) controls the absorbent circuit (15) and the refrigerant circuit (40) so that the humidity control apparatus is operated in any one of the first to fifth operation modes. Thus, the dehumidification operation suitable for the air-conditioning load, for example, can be performed.

Third Embodiment

In the first and second embodiments, the controller (50) (corresponding to the refrigerant circuit control unit) may control the refrigerant circuit (40) so that the temperature of the liquid absorbent and the temperature of the target air (outdoor air (OA)) satisfy the condition "the temperature of the liquid absorbent at the inlet of the liquid-based dehumidification module (21)≤the temperature of the air at the outlet of the refrigerant-cooling-based dehumidification module (48)." That is, the controller (50) of the present embodiment controls the refrigerant circuit (40) so that the temperature of the target air (outdoor air (OA)) that has flowed out of the refrigerant-cooling-based dehumidification module (48) and is not dehumidified yet by the liquid-based dehumidification module (21) becomes equal to or higher than the temperature of the liquid absorbent flowing into the liquid-based dehumidification module (21).

Figure 11:
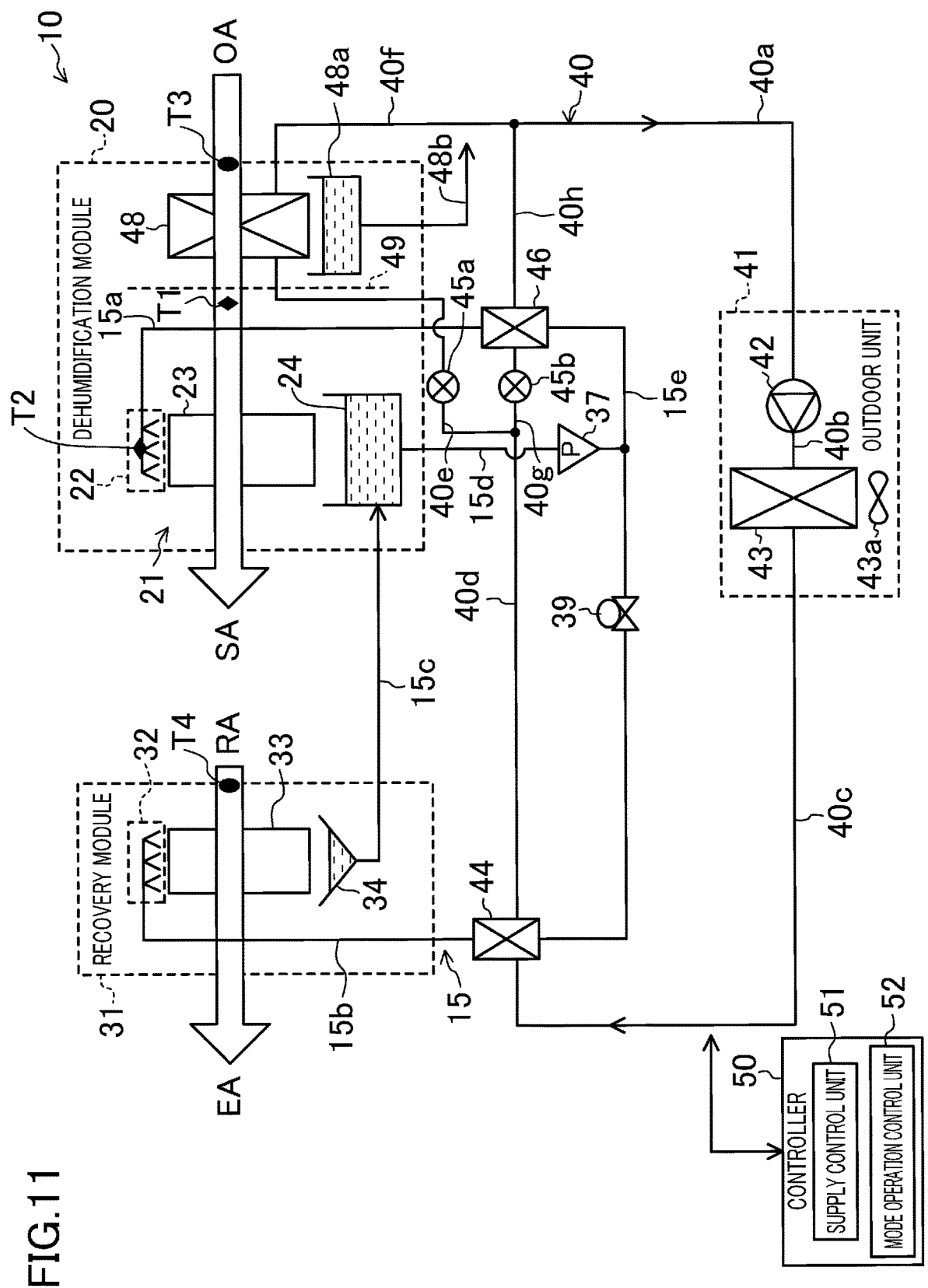
FIG. 11 is a diagram illustrating a humidity control apparatus of a third embodiment obtained by providing components such as a temperature detection sensor for the humidity control apparatus of the second embodiment.

With reference to FIG. 11, description will be given of an example of a method for measuring the temperature of the liquid absorbent and the temperature of the outdoor air (OA) and a method for controlling the refrigerant circuit (40). FIG. 11 shows the configuration of the humidity control apparatus (10) of the second embodiment in the case where the above-described control of the present embodiment is performed.

As shown in FIG. 11, the humidity control apparatus (10) is provided with an air temperature sensor (T1) for measuring the temperature of the outdoor air (OA), and a liquid temperature sensor (T2) for measuring the temperature of the liquid absorbent. The air temperature sensor (T1) is provided near the outlet for the outdoor air (OA) of the refrigerant-cooling-based dehumidification module (48), and detects the temperature of the outdoor air (OA) that has flowed out of the refrigerant-cooling-based dehumidification module (48) and is not dehumidified yet by the liquid-based dehumidification module (21). The liquid temperature sensor (T2) is provided near the drip ports for the liquid absorbent of the dehumidification-side liquid feeder (22), and detects the temperature of the liquid absorbent dripped from the dehumidification-side liquid feeder (22) to the dehumidification-side gas-liquid contact portion (23).

The humidity control apparatus (10) is further provided with two temperature-humidity sensors (T3, T4). The temperature-humidity sensor (T3) is provided near the inlet for the outdoor air (OA) of the refrigerant-cooling-based dehumidification module (48), and detects the temperature and humidity of the outdoor air (OA) (i.e., the outdoor air (OA) before being dehumidified) supplied to the refrigerant-cooling-based dehumidification module (48). The temperature-humidity sensor (T4) is provided near the inlet for the room air (RA) of the recovery module (31), and detects the temperature and humidity of the room air (RA) (i.e., the room air before being used for recovery of the liquid absorbent) supplied to the recovery module (31).

The controller (50) determines a target value of the temperature of the liquid absorbent at the inlet of the liquid-based dehumidification module (21) and a target value of the temperature of the air at the outlet of the refrigerant-cooling-based dehumidification module (48) in accordance with the humidity of the room air (RA) detected by the temperature-humidity sensor (T4) or the set temperature of the supply air (SA) supplied to the room, and the temperature and humidity of the outdoor air (OA) detected by the temperature-humidity sensor (T3). In a preferred embodiment, each of the target values is determined by using a calculation formula or the like which satisfies the following condition: "the temperature of the liquid absorbent at the inlet of the liquid-based dehumidification module (21)≤the temperature of the air at the outlet of the refrigerant-cooling-based dehumidification module (48)."

This calculation formula is determined by a desktop calculation or an empirical expression.

Then, the controller (50) adjusts the number of revolutions (operation frequency), which is the output of the compressor (42), and the opening degree of each of the first expansion valve (45a) and the second expansion valve (45b), so that the actual detection value of the air temperature sensor (T1) reaches the target value of the temperature of the air at the outlet of the refrigerant-cooling-based dehumidification module (48) and the actual detection value of the liquid temperature sensor (T2) reaches the target value of the temperature of the liquid absorbent at the inlet of the liquid-based dehumidification module (21).

Figure 12:
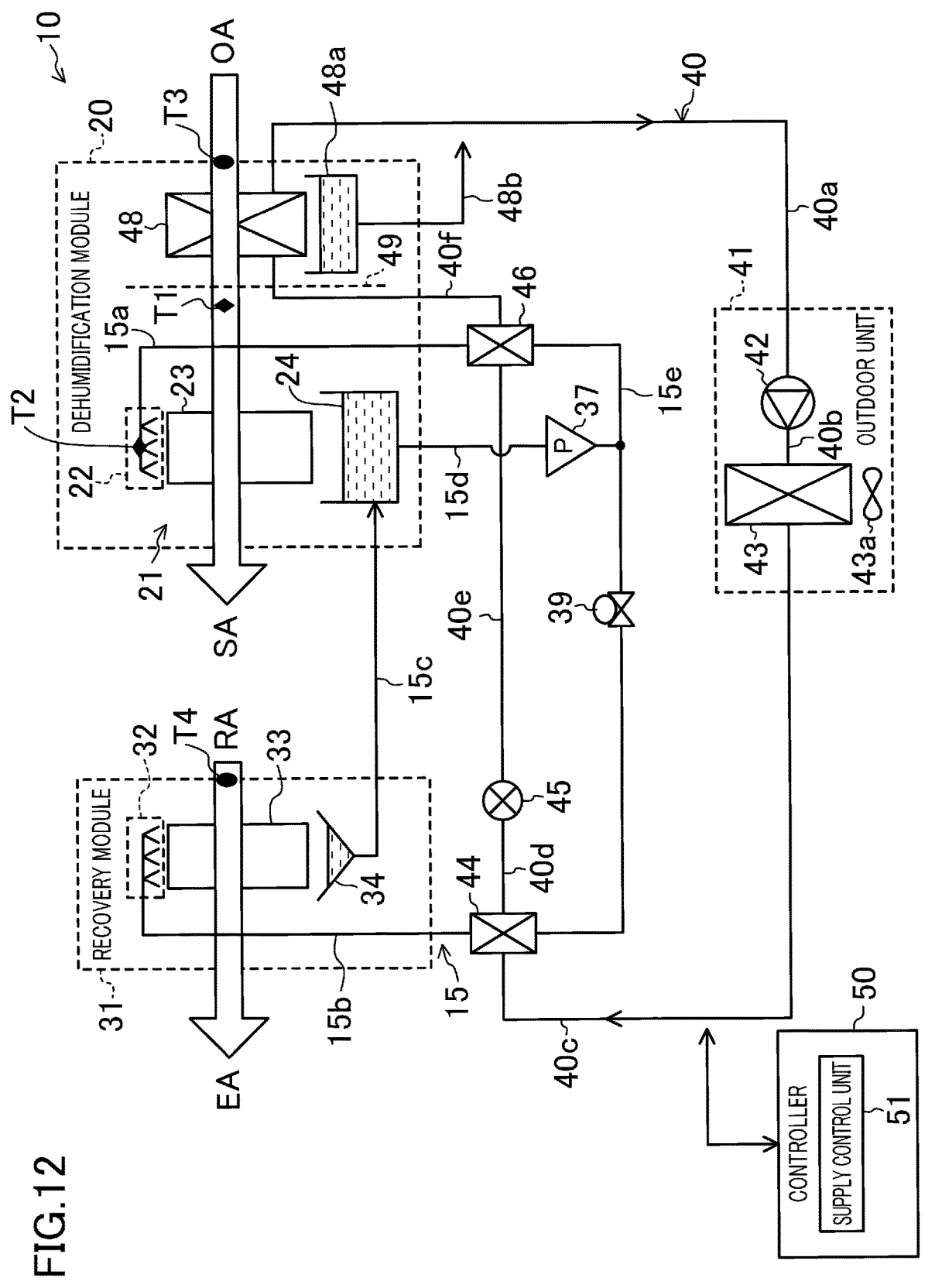

FIG. 12 shows the configuration of the humidity control apparatus (10) of the first embodiment in the case where the above-described control of the present embodiment is performed. Also in FIG. 12, the method of controlling the refrigerant circuit (40) as described above can be employed to satisfy the condition "the temperature of the liquid absorbent at the inlet of the liquid-based dehumidification module (21)≤the temperature of the air at the outlet of the refrigerant-cooling-based dehumidification module (48)."

Advantages

In the present embodiment, the following advantages are obtained in addition to those of the first and second embodiments.

The controller (50) of the present embodiment controls the refrigerant circuit (40) so that the temperature of the outdoor air (OA) that has flowed out of the refrigerant-cooling-based dehumidification module (48) and is not dehumidified yet by the liquid-based dehumidification module (21) becomes equal to or higher than the temperature of the liquid absorbent flowing into the liquid-based dehumidification module (21). This can avoid a phenomenon in which the outdoor air (OA) is excessively cooled and dehumidified by the refrigerant-cooling-based dehumidification module (48), and the dehumidification amount in the liquid-based dehumidification module (21) is significantly decreased, as a result of which the efficiency of dehumidification of the outdoor air (OA) by the entire humidity control apparatus (10) is impaired. Further, this can reduce the possibility of the occurrence of so-called reheat loss in which the outdoor air (OA) cooled and dehumidified by the refrigerant-cooling-based dehumidification module (48) is reheated by the liquid absorbent in the liquid-based dehumidification module (21).

OTHER EMBODIMENTS

Figure 13:
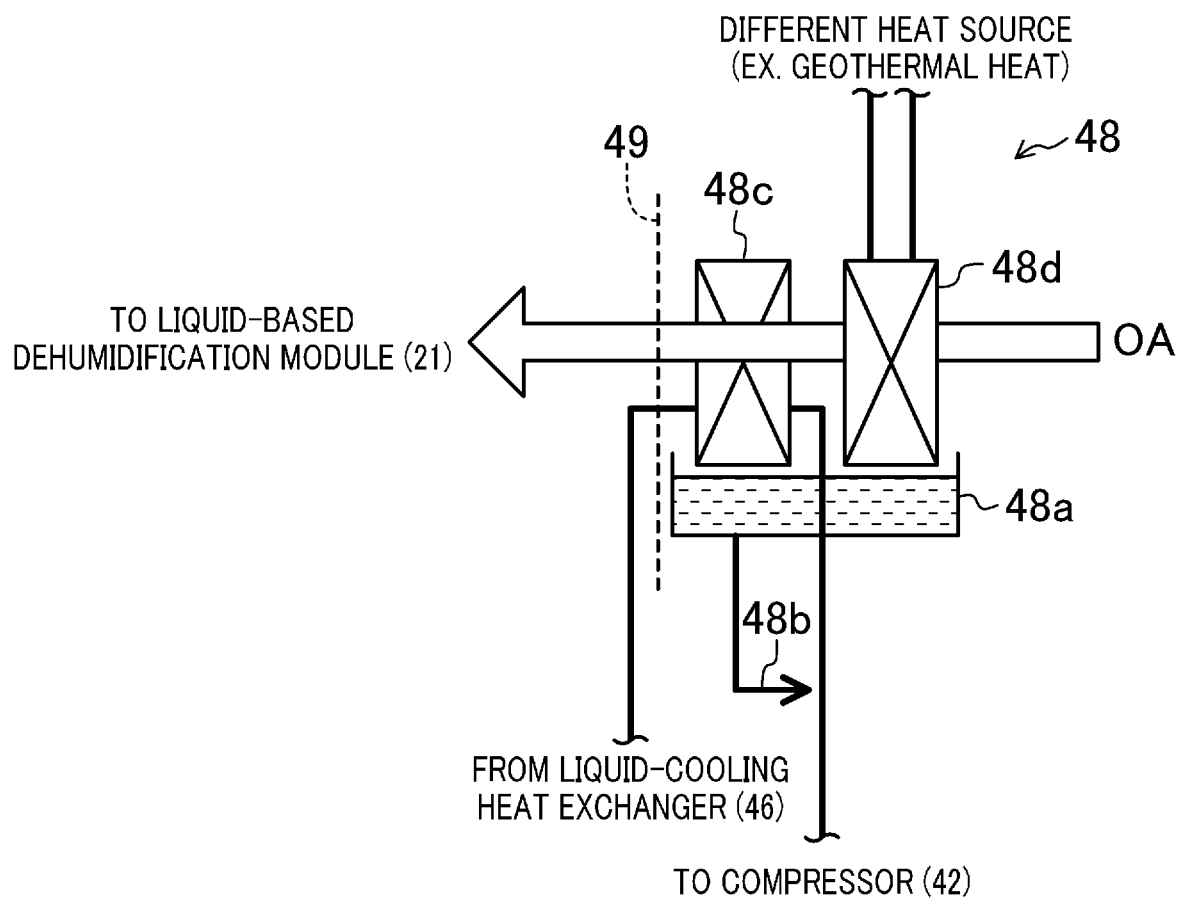
FIG. 13 is a diagram schematically illustrating the configuration of a humidity control apparatus of another embodiment.

As shown in FIG. 13, a plurality of refrigerant-cooling-based dehumidification modules (48) may be provided. FIG. 13 illustrates an example in which the refrigerant-cooling-based dehumidification module (48) includes a first module (48c) and a second module (48d).

The first module (48c) and the second module (48d) are arranged such that the second module (48d) is positioned upstream of the first module (48c) in the flow direction of the outdoor air (OA) which is the target air. The first module (48c) is connected to the refrigerant circuit (40) (e.g., the liquid-cooling heat exchanger (46) and the compressor (42) shown in FIG. 1), and the second module (48d) is connected to neither of the refrigerant circuit (40) nor the absorbent circuit (15). Thus, the outdoor air (OA), which is the target air, is first subjected to the handling of sensible heat in the second module (48d), and then is cooled and dehumidified in the first module (48c). The target air that has been cooled and dehumidified is further dehumidified by the liquid absorbent in the liquid-based dehumidification module (21). Specifically, in FIG. 13, the outdoor air (OA) is humidified in three stages. Thus, compared to the examples shown in FIGS. 1 and 4, the sensible heat load and the latent heat load can be handled at a more suitable temperature, which can improve the dehumidification efficiency.

In particular, FIG. 13 illustrates the case where the second module (48d) is connected to, for example, a geothermal heat exchanger, a cooling tower, or the like. This configuration makes it possible for the second module (48d) to effectively use a different heat source. Furthermore, since the second module (48d) and the first module (48c) use different heat sources, the degree of humidity control of the target air by the second module (48d) and the degree of humidity control of the target air by the first module (48c) can be reliably distinguished.

Figure 14:
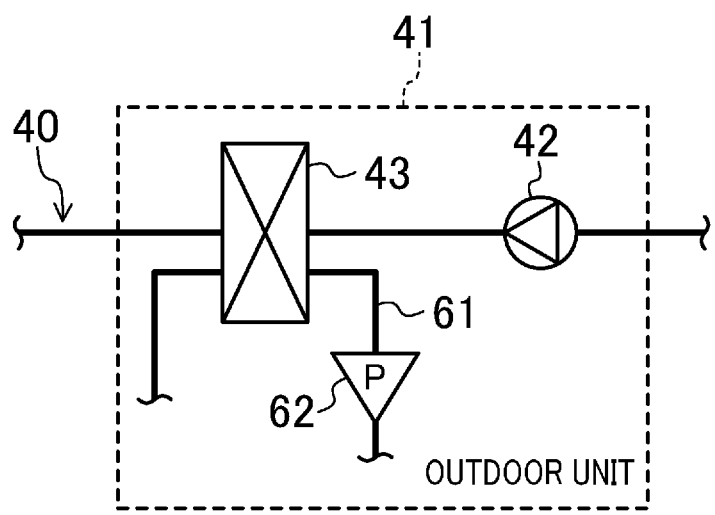
FIG. 14 is a diagram schematically illustrating the configuration of a humidity control apparatus different from that shown in FIG. 13.

The heat dissipation fluid to which the heat dissipation condenser (43) dissipates heat may be a substance other than the room air (RA), such as water. In this case, the heat dissipation condenser (43) is configured as a heat exchanger which exchanges heat between a refrigerant and water. Instead of providing the fan (43a) shown in FIGS. 1 and 4, the outdoor unit (41) may be provided with a water circulation circuit (61) having a pump (62) for supplying water to the heat dissipation condenser (43) as shown in FIG. 14. Thus, the heat dissipation condenser (43) can dissipate the condensation heat of the refrigerant generated in the refrigerant-cooling-based dehumidification module (48) to water.

The heat dissipation condenser (43) and the fan (43a) are not essential, and may be omitted.

Even when the heat dissipation condenser (43) is provided, the condition for stopping the supply of the heat dissipation fluid to the heat dissipation condenser (43) is not limited to the condensation temperature of the refrigerant which is equal to or lower than a predetermined value. For example, when the latent heat load is equal to or less than a predetermined load, the supply control unit (51) may determine that heat (condensation heat) to be handled by the heat dissipation condenser (43) is not generated in the refrigerant-cooling-based dehumidification module (48), and may stop the operation of the to fan (43a). In this case, when the latent heat load exceeds the predetermined load, the supply control unit (51) determines that heat (condensation heat) to be handled by the heat dissipation condenser (43) is generated in the refrigerant-cooling-based dehumidification module (48), and operates the fan (43a). Whether the latent heat load exceeds the predetermined load or not may be determined based on whether the dew point temperature of the outdoor air (OA) is higher than the evaporation temperature of the refrigerant or not. That is, in the case where the amount of heat (condensation heat) generated in the refrigerant-cooling-based dehumidification module (48) is so large that the amount of heat generated in the two dehumidification modules (21, 48) cannot be handled only through the heat dissipation in the recovery module (31), the fan (43a) is operated to dissipate heat in the heat dissipation condenser (43).

The first to fifth operation modes according to the second embodiment may be switched under the conditions different from those described in the second embodiment.

In the third embodiment, the temperature of the liquid absorbent may be estimated based on, for example, the temperature in the pipe connected to the liquid-cooling heat exchanger (46), instead of direct detection by the liquid temperature sensor (T2). Further, the temperature of the target air (outdoor air (OA)) may be estimated based on, for example, the result of detection of the temperature-humidity sensor (T3), instead of the direct detection by the air temperature sensor (T1).

INDUSTRIAL APPLICABILITY

As can be seen in the foregoing, the present invention makes it possible to sufficiently dehumidify the target air without intentionally increasing the contact area between the liquid absorbent and the air in the liquid-based dehumidification unit, regardless of the degree of the hygroscopic performance of the liquid absorbent. Therefore, the present invention is useful for a humidity control apparatus that can be installed in a place where it is hard to install a large humidity control apparatus.

DESCRIPTION OF REFERENCE CHARACTERS

10 Humidity Control Apparatus
15 Absorbent Circuit
21 Liquid-based Dehumidification Module (Liquid-based Dehumidification Unit)
31 Recovery Unit
37 Pump
40 Refrigerant Circuit
43 Heat Dissipation Condenser (Heat Dissipation Heat Exchanger)
46 Liquid-Cooling Heat Exchanger
48 Refrigerant-Cooling-Based Dehumidification Module (Refrigerant-Cooling-Based Dehumidification Unit)
50 Controller (Refrigerant Circuit Control Unit)
51 Supply Control Unit
52 Mode Operation Control Unit

The invention claimed is:

1. A humidity control apparatus, comprising:
    an absorbent circuit connecting a liquid-based dehumidifier which causes a liquid absorbent to absorb moisture in target air to dehumidify the target air, a recovery moisture exchanger which releases the moisture in the liquid absorbent to air for recovery to recover the liquid absorbent, and a pump capable of circulating the liquid absorbent between the liquid-based dehumidifier and the recovery moisture exchanger;
    a single refrigerant circuit in which a refrigerant circulates;
    a liquid-cooling heat exchanger which is connected to both of the absorbent circuit and the refrigerant circuit and cools, with a refrigerant of the refrigerant circuit, the liquid absorbent before being used for dehumidification in the liquid-based dehumidifier; and
    a refrigerant-cooling-based dehumidifier which is connected to only the refrigerant circuit out of the absorbent circuit and the refrigerant circuit, and is positioned upstream of the liquid-based dehumidifier in a flow direction of the target air, and cools and dehumidifies, by exchanging heat with the refrigerant of the refrigerant circuit, the target air before being dehumidified in the liquid-based dehumidifier, wherein
    the liquid-cooling heat exchanger, the refrigerant-cooling-based dehumidifier and a liquid-heating heat exchanger are connected to the refrigerant circuit,
    the liquid-heating heat exchanger heats the liquid absorbent before being recovered by the recovery moisture exchanger by exchanging heat with the refrigerant of the refrigerant circuit,
    the humidity control apparatus includes a mode operation controller which controls the absorbent circuit and the refrigerant circuit such that the humidity control apparatus switches an execution of a plurality of mode operations, and
    the plurality of mode operations is a plurality of dehumidification modes in which each dehumidification mode in the plurality of dehumidification modes dehumidifies the target air by using the liquid-based dehumidifier and/or the refrigerant-cooling-based dehumidifier.

2. The humidity control apparatus of claim 1, wherein
    the target air dehumidified in the refrigerant-cooling-based dehumidifier and the liquid-based dehumidifier is supplied into a room, and
    a heat dissipation heat exchanger is further connected to the refrigerant circuit, the heat dissipation heat exchanger dissipating heat of the refrigerant that has passed through the refrigerant-cooling-based dehumidifier to a heat dissipation fluid other than the air in the room.

3. The humidity control apparatus of claim 2, further comprising:
    a supply controller which stops supply of the heat dissipation fluid to the heat dissipation heat exchanger when a condensation temperature of the refrigerant in the refrigerant circuit is equal to or lower than a predetermined value.

4. The humidity control apparatus of claim 1,
    wherein
    the plurality of dehumidification modes comprises a first dehumidification mode, a second dehumidification mode, and a third dehumidification mode, and
    the mode operation controller controls the absorbent circuit and the refrigerant circuit such that the humidity control apparatus is configured to switch an execution of
    the first dehumidification mode in which the target air is dehumidified by the liquid-based dehumidifier and the refrigerant-cooling-based dehumidifier,
    the second dehumidification mode in which the target air is dehumidified by only the liquid-based dehumidifier out of the refrigerant-cooling-based dehumidifier and the liquid-based dehumidifier, and
    the third dehumidification mode in which the target air is dehumidified by only the refrigerant-cooling-based dehumidifier out of the refrigerant-cooling-based dehumidifier and the liquid-based dehumidifier.

5. The humidity control apparatus of claim 1, further comprising:
    a refrigerant circuit controller which controls the refrigerant circuit such that a temperature of the target air that has flowed out of the refrigerant-cooling-based dehumidifier and is not dehumidified yet by the liquid-based dehumidifier is equal to or higher than a temperature of the liquid absorbent flowing into the liquid-based dehumidifier.

6. The humidity control apparatus of claim 2, wherein
    the plurality of dehumidification modes comprises a first dehumidification mode, a second dehumidification mode, and a third dehumidification mode, and
    the mode operation controller controls the absorbent circuit and the refrigerant circuit such that the humidity control apparatus is configured to switch an execution of
    the first dehumidification mode in which the target air is dehumidified by the liquid-based dehumidifier and the refrigerant-cooling-based dehumidifier, the second dehumidification mode in which the target air is dehumidified by only the liquid-based dehumidifier out of the refrigerant-cooling-based dehumidifier and the liquid-based dehumidifier, and the third dehumidification mode in which the target air is dehumidified by only the refrigerant-cooling-based dehumidifier out of the refrigerant-cooling-based dehumidifier and the liquid-based dehumidifier.

7. The humidity control apparatus of claim 3, wherein the plurality of dehumidification modes comprises a first dehumidification mode, a second dehumidification mode, and a third dehumidification mode, and the mode operation controller controls the absorbent circuit and the refrigerant circuit such that the humidity control apparatus is configured to switch an execution of the first dehumidification mode in which the target air is dehumidified by the liquid-based dehumidifier and the refrigerant-cooling-based dehumidifier, the second dehumidification mode in which the target air is dehumidified by only the liquid-based dehumidifier out of the refrigerant-cooling-based dehumidifier and the liquid-based dehumidifier, and the third dehumidification mode in which the target air is dehumidified by only the refrigerant-cooling-based dehumidifier out of the refrigerant-cooling-based dehumidifier and the liquid-based dehumidifier.

8. The humidity control apparatus of claim 2, further comprising:

a refrigerant circuit controller which controls the refrigerant circuit such that a temperature of the target air that has flowed out of the refrigerant-cooling-based dehumidifier and is not dehumidified yet by the liquid-based dehumidifier is equal to or higher than a temperature of the liquid absorbent flowing into the liquid-based dehumidifier.

9. The humidity control apparatus of claim 3, further comprising:

a refrigerant circuit controller which controls the refrigerant circuit such that a temperature of the target air that has flowed out of the refrigerant-cooling-based dehumidifier and is not dehumidified yet by the liquid-based dehumidifier is equal to or higher than a temperature of the liquid absorbent flowing into the liquid-based dehumidifier.

10. The humidity control apparatus of claim 4, further comprising:

a refrigerant circuit controller which controls the refrigerant circuit such that a temperature of the target air that has flowed out of the refrigerant-cooling-based dehumidifier and is not dehumidified yet by the liquid-based dehumidifier is equal to or higher than a temperature of the liquid absorbent flowing into the liquid-based dehumidifier.

11. The humidity control apparatus of claim 6, further comprising:

a refrigerant circuit controller which controls the refrigerant circuit such that a temperature of the target air that has flowed out of the refrigerant-cooling-based dehumidifier and is not dehumidified yet by the liquid-based dehumidifier is equal to or higher than a temperature of the liquid absorbent flowing into the liquid-based dehumidifier.

12. The humidity control apparatus of claim 7, further comprising:

a refrigerant circuit controller which controls the refrigerant circuit such that a temperature of the target air that has flowed out of the refrigerant-cooling-based dehumidifier and is not dehumidified yet by the liquid-based dehumidifier is equal to or higher than a temperature of the liquid absorbent flowing into the liquid-based dehumidifier.

13. A humidity control apparatus, comprising:

an absorbent circuit connecting a liquid-based dehumidifier which causes a liquid absorbent to absorb moisture in target air to dehumidify the target air, a recovery moisture exchanger which releases the moisture in the liquid absorbent to air for recovery to recover the liquid absorbent, and a pump capable of circulating the liquid absorbent between the liquid-based dehumidifier and the recovery moisture exchanger;

a single refrigerant circuit in which a refrigerant circulates;

a liquid-cooling heat exchanger which is connected to both of the absorbent circuit and the refrigerant circuit and cools, with a refrigerant of the refrigerant circuit, the liquid absorbent before being used for dehumidification in the liquid-based dehumidifier; and a refrigerant-cooling-based dehumidifier which is connected to only the refrigerant circuit out of the absorbent circuit and the refrigerant circuit, and is positioned upstream of the liquid-based dehumidifier in a flow direction of the target air, and cools and dehumidifies, by exchanging heat with the refrigerant of the refrigerant circuit, the target air before being dehumidified in the liquid-based dehumidifier, wherein the liquid-cooling heat exchanger, the refrigerant-cooling-based dehumidifier and a liquid-heating heat exchanger are connected to the refrigerant circuit, the liquid-heating heat exchanger heats the liquid absorbent before being recovered by the recovery moisture exchanger by exchanging heat with the refrigerant of the refrigerant circuit, the humidity control apparatus includes a mode operation controller which controls the absorbent circuit and the refrigerant circuit such that the humidity control apparatus switches an execution of a plurality of mode operations, the plurality of mode operations is a plurality of dehumidification modes in which each dehumidification mode in the plurality of dehumidification modes dehumidifies the target air by using the liquid-based dehumidifier and/or the refrigerant-cooling-based dehumidifier, and the humidity control apparatus further comprises:

a liquid tank provided in an absorbent circuit, connected to the liquid-based dehumidifier, and receiving the liquid absorbent that has come into contact with the outside air, and a drain pan formed separately from the liquid tank and discharging condensed water generated in the refrigerant-cooling-based dehumidifier to outside of the humidity control apparatus.

14. A humidity control apparatus, comprising:

an absorbent circuit connecting a liquid-based dehumidifier which causes a liquid absorbent to absorb moisture in target air to dehumidify the target air, a recovery moisture exchanger which releases the moisture in the liquid absorbent to air for recovery to recover the liquid absorbent, and a pump capable of circulating the liquid absorbent between the liquid-based dehumidifier and the recovery moisture exchanger;

a single refrigerant circuit in which a refrigerant circulates;

a liquid-cooling heat exchanger which is connected to both of the absorbent circuit and the refrigerant circuit and cools, with a refrigerant of the refrigerant circuit, the liquid absorbent before being used for dehumidification in the liquid-based dehumidifier; and
a refrigerant-cooling-based dehumidifier which is connected to only the refrigerant circuit out of the absorbent circuit and the refrigerant circuit, and is positioned upstream of the liquid-based dehumidifier in a flow direction of the target air, and cools and dehumidifies, by exchanging heat with the refrigerant of the refrigerant circuit, the target air before being dehumidified in the liquid-based dehumidifier, wherein
the liquid-cooling heat exchanger, the refrigerant-cooling-based dehumidifier and a liquid-heating heat exchanger are connected to the refrigerant circuit,
the liquid-heating heat exchanger heats the liquid absorbent before being recovered by the recovery moisture exchanger by exchanging heat with the refrigerant of the refrigerant circuit,
in the refrigerant circuit, the liquid-cooling heat exchanger and the refrigerant-cooling-based dehumidifier are arranged in parallel, and
the humidity control apparatus includes a mode operation controller which controls the absorbent circuit and the refrigerant circuit such that the humidity control apparatus switches an execution of a plurality of mode operations, and
the plurality of mode operations is a plurality of dehumidification modes in which each dehumidification mode in the plurality of dehumidification modes dehumidifies the target air by using the liquid-based dehumidifier and/or the refrigerant-cooling-based dehumidifier.

15. The humidity control apparatus of claim 14, wherein
the plurality of dehumidification modes comprises a first dehumidification mode, a second dehumidification mode, and a third dehumidification mode, and
the mode operation controller controls the absorbent circuit and the refrigerant circuit such that the humidity control apparatus is configured to switch an execution of
the first dehumidification mode in which the target air is dehumidified by the liquid-based dehumidifier and the refrigerant-cooling-based dehumidifier,
the second dehumidification mode in which the target air is dehumidified by only the liquid-based dehumidifier out of the refrigerant-cooling-based dehumidifier and the liquid-based dehumidifier, and
the third dehumidification mode in which the target air is dehumidified by only the refrigerant-cooling-based dehumidifier out of the refrigerant-cooling-based dehumidifier and the liquid-based dehumidifier,
in the first dehumidification mode, a refrigerant is supplied to both the liquid-cooling heat exchanger and the refrigerant-cooling-based dehumidifier,
in the second dehumidification mode, the refrigerant is supplied only to the liquid-cooling heat exchanger, of the liquid-cooling heat exchanger and the refrigerant-cooling-based dehumidifier, and
in the third dehumidification mode, the refrigerant is supplied only to the refrigerant-cooling-based dehumidifier, of the liquid-cooling heat exchanger and the refrigerant-cooling-based dehumidifier.

* * * * *